(12) United States Patent
Tokuoka et al.

(10) Patent No.: US 12,427,652 B2
(45) Date of Patent: Sep. 30, 2025

(54) INFORMATION PROCESSING APPARATUS, ROBOT SYSTEM, INFORMATION PROCESSING METHOD, MANUFACTURING METHOD FOR PRODUCT, AND RECORDING MEDIUM

(71) Applicant: CANON KABUSHIKI KAISHA, Tokyo (JP)

(72) Inventors: Takemi Tokuoka, Tokyo (JP); Satoshi Sugaya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 339 days.

(21) Appl. No.: 18/170,192

(22) Filed: Feb. 16, 2023

(65) Prior Publication Data
US 2023/0271314 A1    Aug. 31, 2023

(30) Foreign Application Priority Data

Feb. 25, 2022  (JP) ................................ 2022-027375
Jan. 23, 2023  (JP) ................................ 2023-008244

(51) Int. Cl.
*B25J 9/00*   (2006.01)
*B25J 9/16*   (2006.01)
*B25J 19/02*  (2006.01)

(52) U.S. Cl.
CPC ........... *B25J 9/0081* (2013.01); *B25J 9/1671* (2013.01); *B25J 19/023* (2013.01)

(58) Field of Classification Search
CPC ...... B25J 9/0081; B25J 9/1671; B25J 19/023; B25J 9/1697; G05B 2219/40099; G05B 2219/40515
See application file for complete search history.

(56) References Cited

U.S. PATENT DOCUMENTS

| | | | |
|---|---|---|---|
| 10,011,011 B2 | 7/2018 | Sugaya | |
| 10,846,929 B2 | 11/2020 | Sugaya | |
| 11,090,804 B2 | 8/2021 | Sugaya | |
| 2004/0192424 A1* | 9/2004 | Mori | A63F 13/577 463/8 |
| 2019/0321983 A1* | 10/2019 | Chen | B25J 9/1633 |
| 2020/0101599 A1* | 4/2020 | Yoshida | B25J 9/1697 |
| 2020/0238525 A1* | 7/2020 | Drixler | B25J 9/1697 |
| 2021/0339385 A1 | 11/2021 | Sugaya | |

(Continued)

FOREIGN PATENT DOCUMENTS

| | | |
|---|---|---|
| JP | H10-264066 | 10/1998 |
| JP | 2009-269134 | 11/2009 |

(Continued)

OTHER PUBLICATIONS

U.S. Appl. No. 18/301,354, filed Apr. 17, 2023, by Satoshi Sugaya.
U.S. Appl. No. 18/309,942, filed May 1, 2023, by Satoshi Sugaya.

*Primary Examiner* — Abby Lin
*Assistant Examiner* — Danielle M Jackson
(74) *Attorney, Agent, or Firm* — VENABLE LLP

(57) ABSTRACT

An information processing apparatus includes a processor configured to simulate a virtual robot and a virtual image pickup apparatus moving in an interlocked manner with each other in a virtual space. The processor is configured to associate setting information of the virtual image pickup apparatus with a teaching point of the virtual robot.

22 Claims, 31 Drawing Sheets

(56) References Cited

U.S. PATENT DOCUMENTS

2022/0005191 A1\* 1/2022 Connor ................. G06T 7/0012
2022/0402143 A1\* 12/2022 Park ....................... B25J 9/1697

FOREIGN PATENT DOCUMENTS

| JP | 2018-1393 | 1/2018 |
| JP | 2019-81236 | 5/2019 |
| JP | 2019-81242 | 5/2019 |

\* cited by examiner

100
INFORMATION PROCESSING APPARATUS, ROBOT SYSTEM, INFORMATION PROCESSING METHOD, MANUFACTURING METHOD FOR PRODUCT, AND RECORDING MEDIUM

BACKGROUND OF THE INVENTION

Field of the Invention

The present disclosure relates to robot technology.

Description of the Related Art

A robot system in which a robot holds an image pickup apparatus to capture an image of a target object is known. In such a robot system, teaching needs to be performed on the robot before the actual work.

Japanese Patent Laid-Open No. 2019-081236 discloses that, in a simulation apparatus that performs simulation of a virtual robot, input of information about the depth of field and field of view of a virtual image pickup portion is received, and the field of view is displayed on a display portion.

SUMMARY OF THE INVENTION

According to a first aspect of the present invention, an information processing apparatus includes a processor configured to simulate a virtual robot and a virtual image pickup apparatus moving in an interlocked manner with each other in a virtual space. The processor is configured to associate setting information of the virtual image pickup apparatus with a teaching point of the virtual robot.

According to a second aspect of the present invention, an information processing method for simulating a virtual robot and a virtual image pickup apparatus moving in an interlocked manner with each other in a virtual space includes associating setting information of the virtual image pickup apparatus with a teaching point of the virtual robot.

Further features of the present invention will become apparent from the following description of exemplary embodiments with reference to the attached drawings.

DESCRIPTION OF THE EMBODIMENTS

In the method described in Japanese Patent Laid-Open No. 2019-081236, a case where the settings of the image pickup apparatus are changed while the robot is operating is not supported, and it is desired that the operation of the robot and the operation related to imaging by the image pickup apparatus are efficiently designed.

The present disclosure relates to a technique of enabling efficient design of the operation of the robot and the operation related to imaging by the image pickup apparatus.

Exemplary embodiments of the present disclosure will be described in detail below with reference to drawings.

First Embodiment

Figure 1:
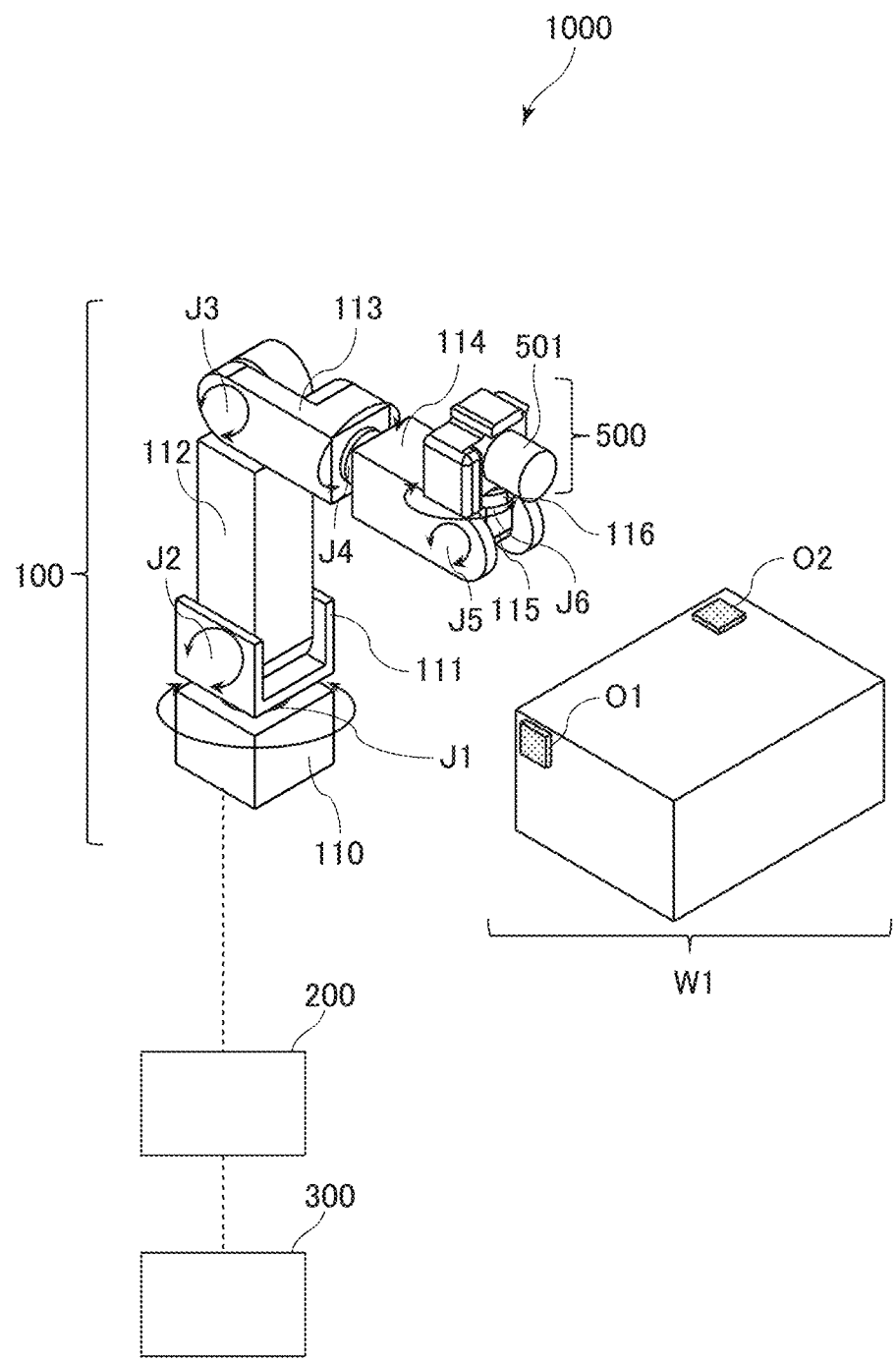
FIG. 1 is an explanatory diagram of a robot system according to a first embodiment.

FIG. 1 is an explanatory diagram of a robot system 1000 according to a first embodiment. The robot system 1000 includes a robot 100, an image pickup apparatus 500, a control apparatus 200, and an information processing apparatus 300.

The robot 100 is an industrial robot, and can be used for holding a holding target object. In FIG. 1, the robot 100 is holding the image pickup apparatus 500. The robot 100 is a manipulator. The robot 100 is disposed in the state of being positioned on an unillustrated stand. A workpiece W1 is disposed near the robot 100 in the state of being positioned. The workpiece W1 includes a plurality of imaging targets O1 and O2. For example, the imaging targets O1 and O2 are information such as barcodes like QR codes (registered trademark) or part numbers, and are imaging targets for the image pickup apparatus 500. In the first embodiment, a case where the imaging targets O1 and O2 are imaged to read information will be described as an example.

For example, the robot 100 is a vertically articulated robot arm. A fixed end serving as the proximal end of the robot 100 is fixed to the unillustrated stand. The image pickup apparatus 500 is attached to a free end serving as the distal end of the robot 100. As a result of this, the image pickup apparatus 500 is held by the robot 100. The robot 100 includes a base 110 and a plurality of links 111 to 116. The base 110 and the links 111 to 116 are interconnected via joints J1 to J6, and thus the links 111 to 116 are respectably rotatable in directions indicated by arrows at the joints J1 to J6. In the present embodiment, the link 116 serves as the distal end of the robot 100, and the image pickup apparatus 500 is fixed to the link 116.

The joints J1 to J6 of the robot 100 are each provided with an unillustrated motor serving as a drive source, and as a result of the motors respectively driving the joints J1 to J6, that is, the links 111 to 116, the robot 100 can take various positions.

The robot 100 may include a robot hand attached to the link 116. The robot 100 can grip a workpiece by the robot hand to perform a conveyance work and an assembly work of joining the workpiece to another workpiece, or grip a tool to perform a processing work of the workpiece. Alternatively, the robot 100 can also perform a work by attaching an actuator different from the robot hand to the link 116 in accordance with the details of the work in the manufacturing process.

The image pickup apparatus 500 is, for example, a digital camera, and includes a lens 501, an unillustrated image sensor, and so forth. The image pickup apparatus 500 images, in accordance with setting information, an object present within the field of view, that is, within the imaging region, and transmits image data obtained by this imaging to the control apparatus 200.

The workpiece W1 is disposed near the robot 100 in a position and orientation determined with respect to the robot 100. The workpiece W1 is formed in, for example, an approximately rectangular parallelepiped shape. The imaging target O1 is disposed on one surface of the workpiece W1, and the imaging target O2 is disposed on a surface of the workpiece W1 different from the surface on which the imaging target O1 is disposed. The outer shape of each of the imaging targets O1 and O2 is, for example, a quadrangular shape in plan view.

The control apparatus 200 illustrated in FIG. 1 controls the operation of the robot 100 on the basis of the operation information of the robot 100, that is, on the basis of teaching data indicating a robot program, and in association with the operation of the robot 100, controls the operation related to imaging by the image pickup apparatus 500, that is, an imaging operation. The control apparatus 200 obtains the teaching data from the information processing apparatus 300. The teaching data includes information of a command to the robot 100, information of a teaching point of the robot 100, setting information of the image pickup apparatus 500, and so forth. In the present embodiment, the control apparatus 200 operates the robot 100 on the basis of the teaching data, and causes the image pickup apparatus 500 to image the imaging targets O1 and O2. Then, the control apparatus 200 obtains pieces of image data in which the imaging targets O1 and O2 are respectively captured from the image pickup apparatus 500.

The information processing apparatus 300 is constituted by a computer, and functions as a simulator. In the present embodiment, the information processing apparatus 300 generates the teaching data by computer simulation, that is, offline teaching. The teaching data generated by the information processing apparatus 300 is output to the control apparatus 200. How the teaching data is output to the control apparatus 200 is not particularly limited. For example, the teaching data generated by the information processing apparatus 300 may be output to the control apparatus 200 via wired communication, wireless communication, or an unillustrated storage device.

Figure 2A:
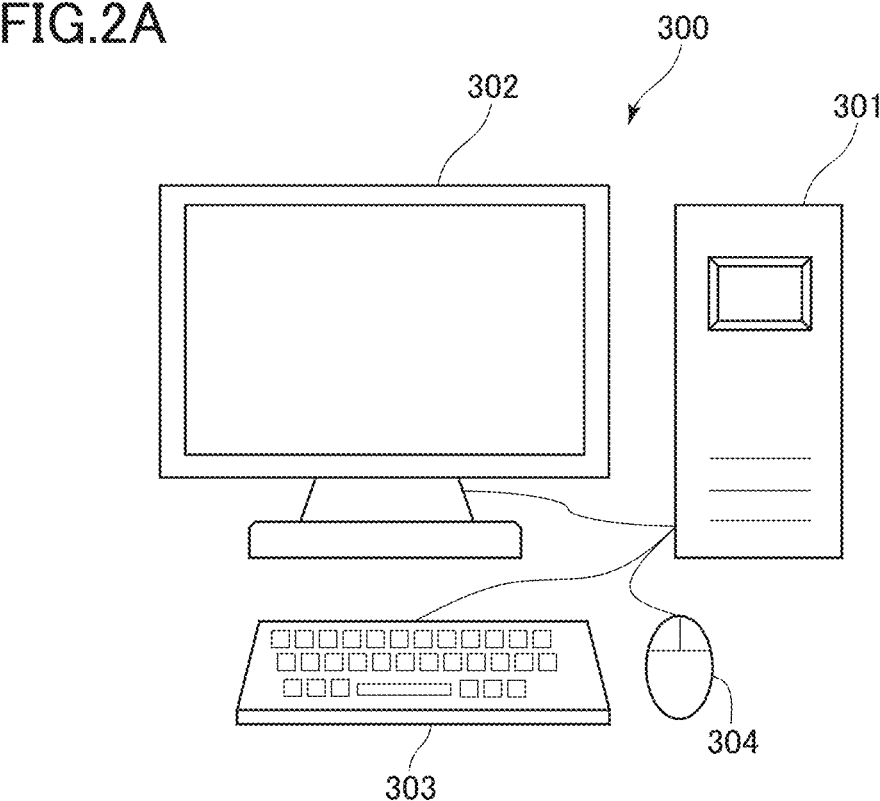
FIG. 2A is an explanatory diagram of an information processing apparatus according to the first embodiment.

FIG. 2A is an explanatory diagram of the information processing apparatus 300 according to the first embodiment. The information processing apparatus 300 includes an apparatus body 301, a display 302 serving as an example of a display portion connected to the apparatus body 301, and a keyboard 303 and a mouse 304 that serve as an example of an input portion connected to the apparatus body 301. Although a case where the information processing apparatus 300 is a desktop personal computer: desktop PC that is a general-purpose computer will be described as an example below, the configuration is not limited to this. The information processing apparatus 300 may be, for example, a general-purpose computer such as a laptop PC, a tablet PC, or a smartphone, a teaching pendant, or a computer only designed as a simulator. In addition, the information processing apparatus 300 may be incorporated in the control apparatus 200. That is, the control apparatus 200 may have a function as a simulator. In addition, a touch panel display in which a display portion and an input portion are integrated may be used in place of the display 302, the keyboard 303, and the mouse 304.

Figure 2B:
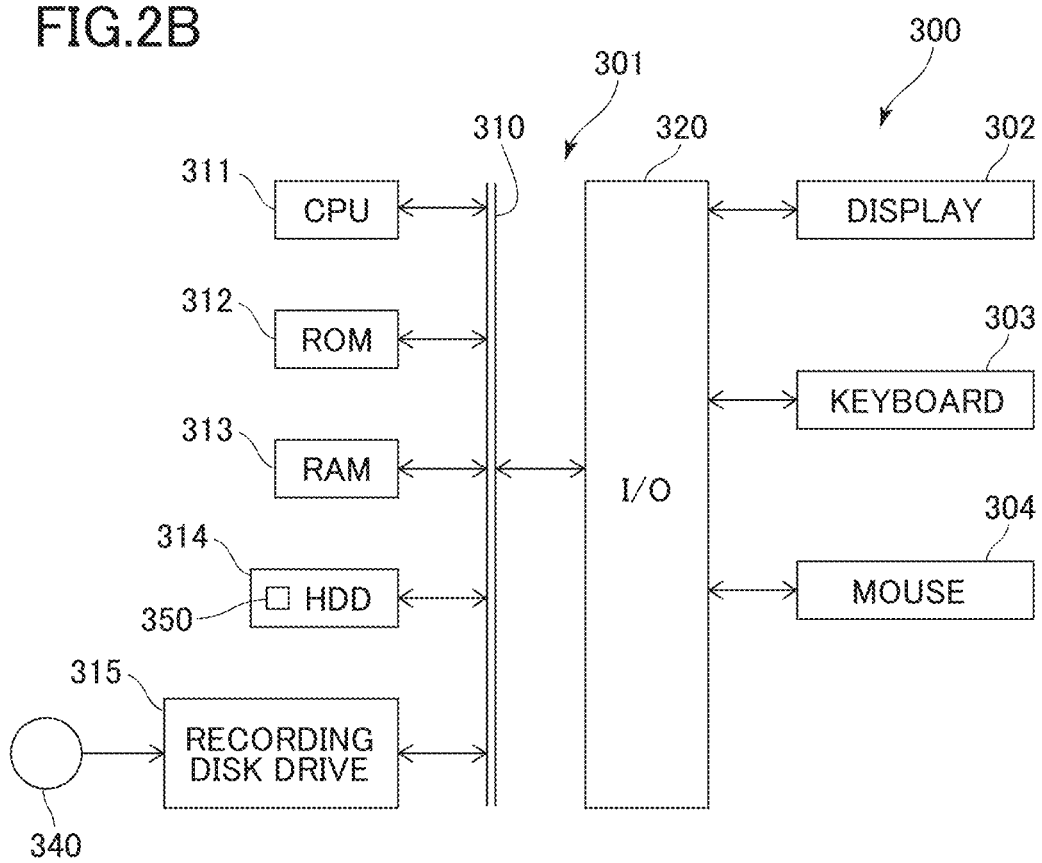
FIG. 2B is a block diagram of the information processing apparatus according to the first embodiment.

FIG. 2B is a block diagram of the information processing apparatus 300 according to the first embodiment. The apparatus body 301 of the information processing apparatus 300 includes a central processing unit: CPU 311 that is a processor. The CPU 311 is an example of a processor.

In addition, the apparatus body 301 includes a read-only memory: ROM 312, a random access memory: RAM 313, and a hard disk drive: HDD 314 as storage portions. In addition, the apparatus body 301 includes a recording disk drive 315, and an input/output: I/O 320 that is an input/output interface. The CPU 311, the ROM 312, the RAM 313, the HDD 314, the recording disk drive 315, and the I/O 320 are mutually communicably interconnected via a bus 310.

The ROM 312 is a non-transitory storage device. The ROM 312 stores a basic program to be loaded by the CPU 311 at the time of booting the computer. The RAM 313 is a transitory storage device used for arithmetic processing by the CPU 311. The HDD 314 is a non-transitory storage device that stores various data such as the results of the arithmetic processing by the CPU 311. In the present embodiment, the HDD 314 stores a program 350. The program 350 is application software. By executing the program 350, the CPU 311 functions as a processor capable of simulating the behavior of a virtual robot and a virtual image pickup apparatus in a virtual environment (virtual space) that will be described later.

The recording disk drive 315 can read out various data, programs, and the like recorded in a recording disk 340. The I/O 320 functions as an interface to the outside. The I/O 320 is connected to the display 302, the keyboard 303, and the mouse 304. Under the control of the CPU 311, the display 302 displays a UI image serving as a user interface: UT, and an image reflecting information input by the user by using the keyboard 303 and the mouse 304. The teaching data including information of the teaching point is generated by the CPU 311 executing the program 350.

To be noted, although the HDD 314 is a non-transitory computer-readable recording medium and stores the program 350 in the present embodiment, the configuration is not limited to this. The program 350 may be recorded in any recording medium as long as the recording medium is a non-transitory computer-readable recording medium. As the recording medium for supplying the program 350 to the computer, for example, a flexible disk, an optical disk, a magneto-photo disk, a magnetic tape, a nonvolatile memory, or the like can be used.

Figure 3:
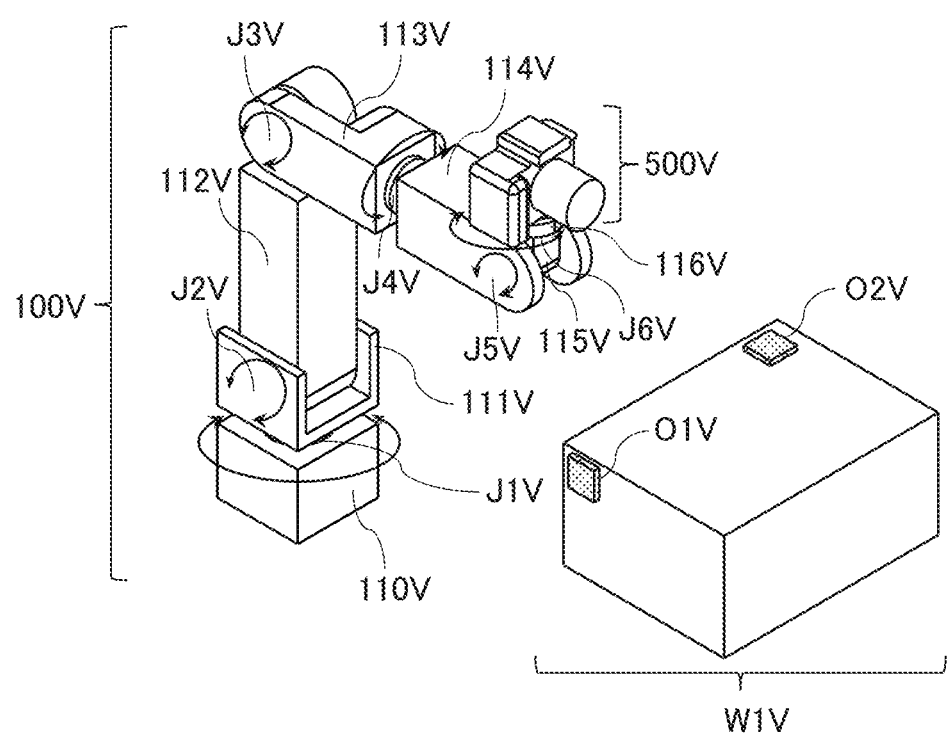
FIG. 3 is an explanatory diagram of a virtual space based on simulation by the information processing apparatus according to the first embodiment.

FIG. 3 is an explanatory diagram of a virtual space R for simulation by the information processing apparatus 300 according to the first embodiment. The CPU 311 defines the virtual space R illustrated in FIG. 3 as a virtual environment. Virtual objects in the virtual space R are defined by three-dimensional model data, for example, computer-aided design data: CAD data, and are illustrated as visible structures in FIG. 3 for the sake of convenience.

The virtual objects defined in the virtual space R illustrated in FIG. 3 will be described. In the virtual space R, a virtual robot 100V, a virtual image pickup apparatus 500V, and a virtual workpiece W1V are defined. The virtual robot 100V is defined by three-dimensional model data imitating the robot 100 illustrated in FIG. 1. The virtual image pickup apparatus 500V is defined by three-dimensional model data imitating the image pickup apparatus 500 illustrated in FIG. 1. The virtual workpiece W1V is defined by three-dimensional model data imitating the workpiece W1 illustrated in FIG. 1. The virtual workpiece W1V includes virtual imaging targets O1V and O2V imitating the imaging targets O1 and O2 illustrated in FIG. 1. The virtual space R illustrated in FIG. 3 is displayed as a still image or a moving image on the display 302 illustrated in FIG. 2A.

The virtual robot 100V includes a virtual base 110V, and a plurality of virtual links 111V to 116V The virtual base 110V and the virtual links 111V to 116V are defined to be interconnected via virtual joints J1V to J6V. As a result of this, simulation can be performed such that the virtual links 111V to 116V respectively rotate in directions indicated by arrows at the virtual joints J1V to J6V. The virtual image pickup apparatus 500V is defined to be associated with the virtual link 116V and move in an interlocked manner with the virtual link 116V That is, when simulating the virtual link 116V to move in the virtual space R, the CPU 311 performs simulation such that the virtual image pickup apparatus 500V moves in an interlocked manner with the virtual link 116V while maintaining the relative position and orientation thereof with respect to the virtual link 116V in the virtual space R.

The CPU 311 executes the following information processing method, that is, simulation by executing the program 350. In the description below, it is assumed that data of three teaching points are set in advance in the information processing apparatus 300 as a plurality of teaching points. That is, the data of the three teaching points are stored in the HDD 314. In addition, the setting information of the image pickup apparatus 500, that is, the setting information of the virtual image pickup apparatus 500V are set in association with each of the plurality of teaching points by the processing by the CPU 311 that will be described later.

Here, in the information processing apparatus 300, the teaching points are used for simulation of a virtual operation by the virtual robot 100V, and in the control apparatus 200, the teaching points are used for control of the actual operation of the robot 100. In addition, in the information processing apparatus 300, the setting information is used for simulation of a virtual imaging operation by the virtual image pickup apparatus 500V, and in the control apparatus 200, the setting information is used for control of the actual imaging operation by the image pickup apparatus 500. That is, the setting information set for the virtual image pickup apparatus 500V is the same as the setting information set by a function of the image pickup apparatus 500 that is an actual apparatus.

Figure 4:
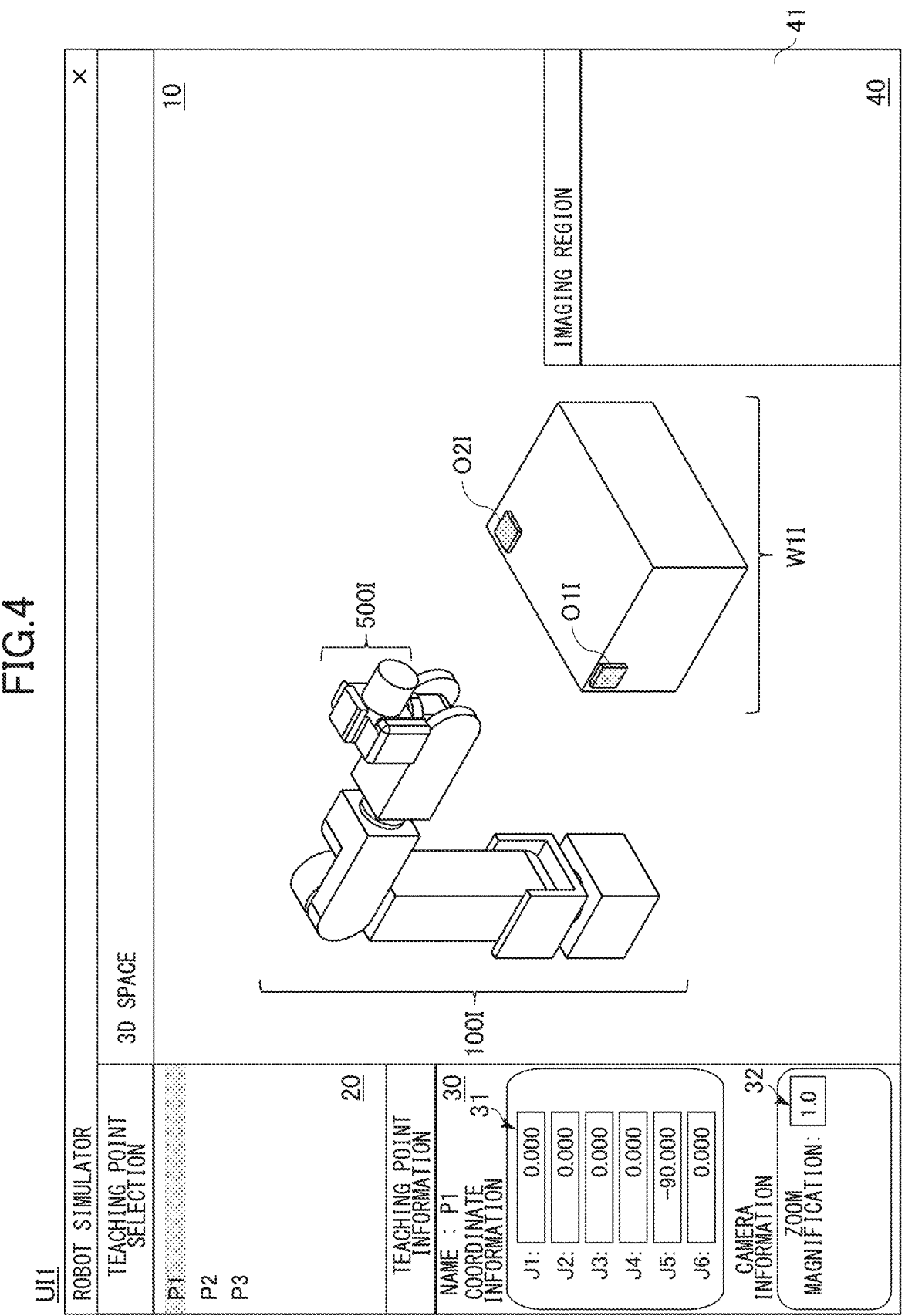
FIG. 4 is an explanatory diagram of an example of a UI window according to the first embodiment.
Figure 5:
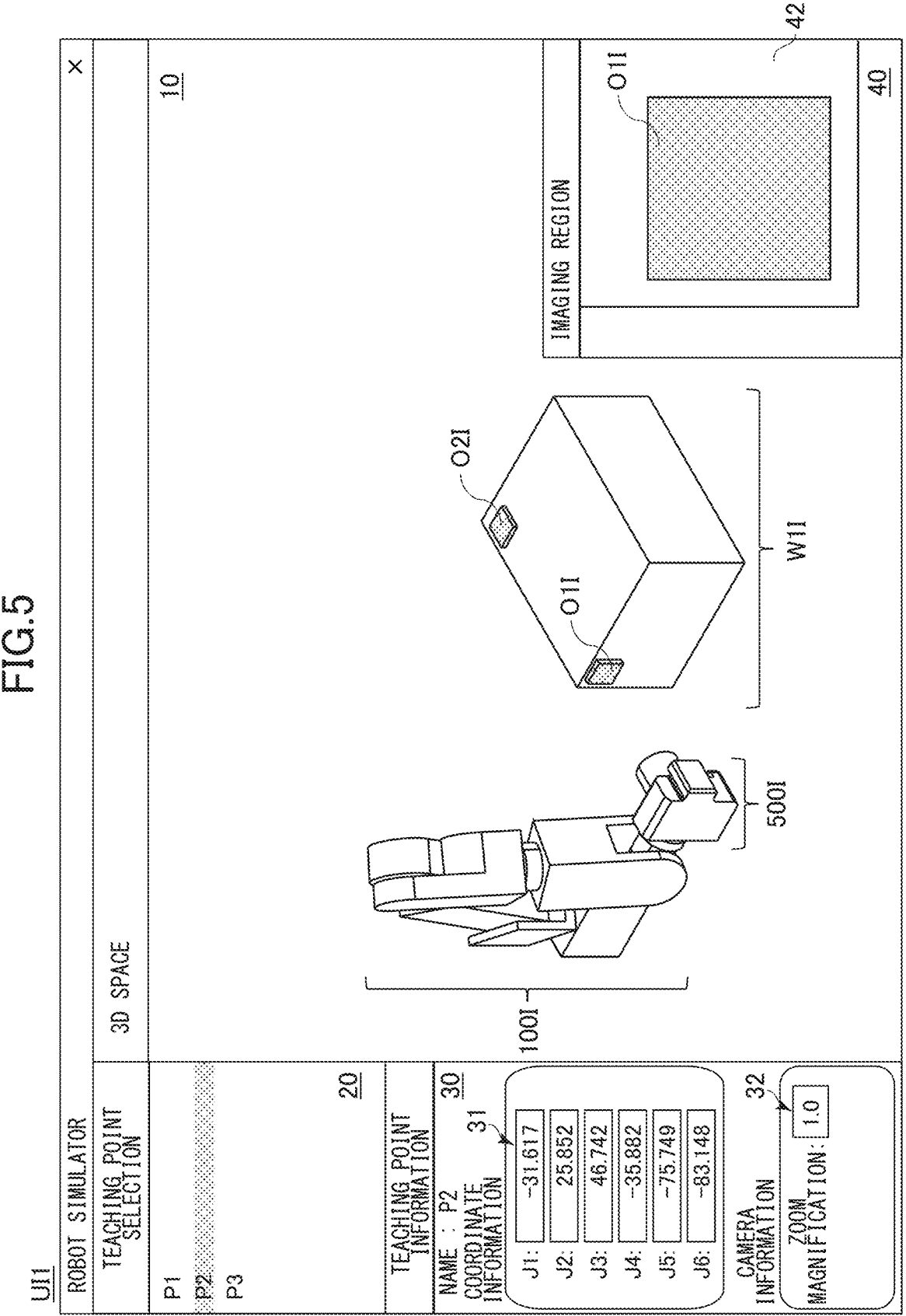
FIG. 5 is an explanatory diagram of an example of a UI window according to the first embodiment.
Figure 6:
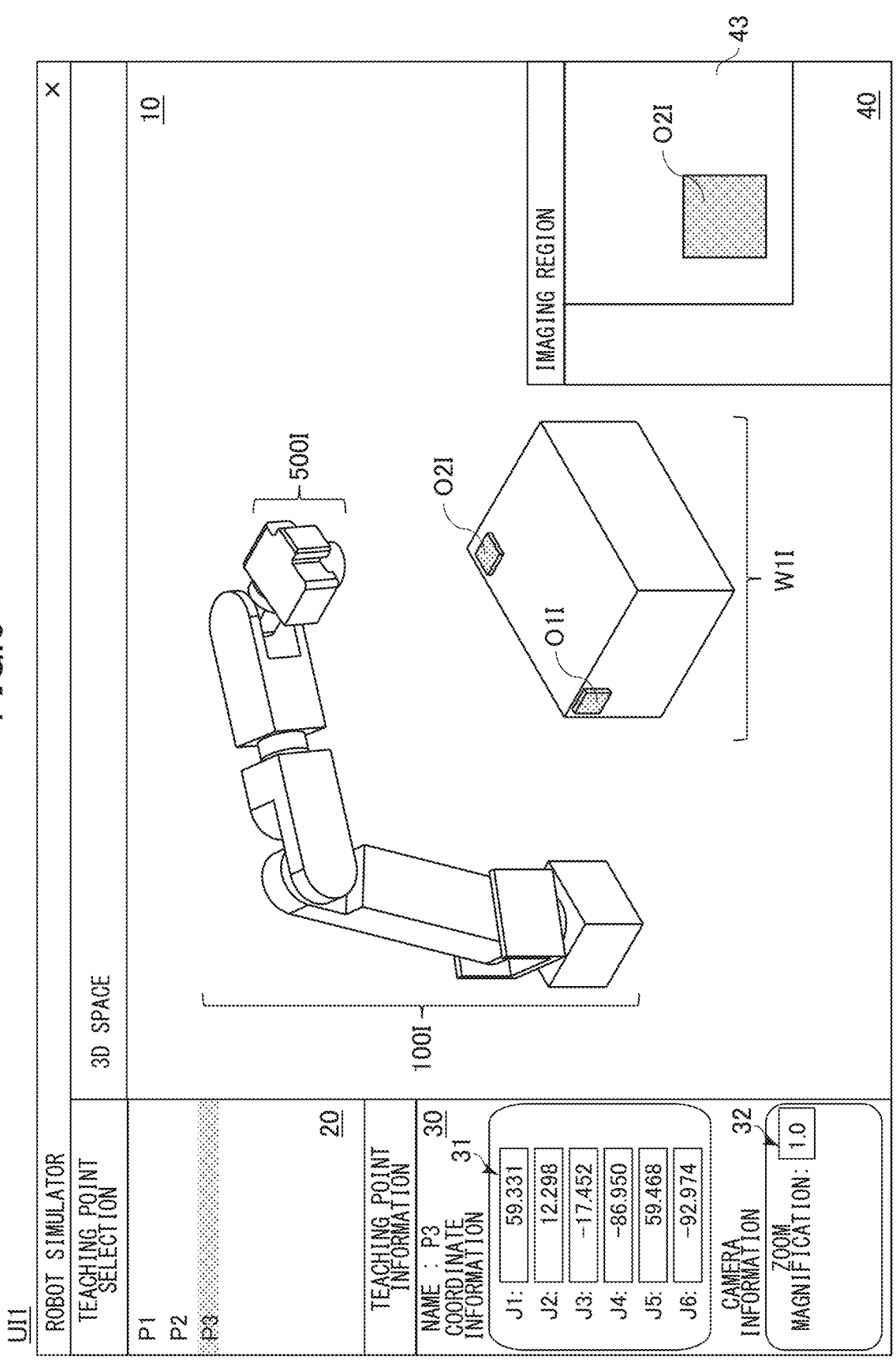
FIG. 6 is an explanatory diagram of an example of a UI window according to the first embodiment.

FIGS. 4 to 6 are explanatory diagrams of an example of a UI window UI1 according to the first embodiment. When the CPU 311 executes the program 350, the CPU 311 displays, on the display 302, the UI window UI1 serving as an example of a UI image as illustrated in FIGS. 4 to 6. In the first embodiment, the CPU 311 receives input and selection from a user via the UI window UI1. To be noted, although the input from the user via the UI window UI1 can be performed by using the keyboard 303 and the mouse 304, the configuration is not limited to this. In addition, although the selection by the user via the UI window UI1 can be performed by using the mouse 304, the configuration is not limited to this.

The UI window UI1 includes a three-dimensional space display area 10, a teaching point selection area 20, a teaching point information display area 30, and an imaging region display area 40.

The three-dimensional space display area 10 displays the virtual objects defined in the virtual space R as images. That is, the three-dimensional space display area 10 displays a robot image 100I corresponding to the virtual robot 100V, a camera image 500I corresponding to the virtual image pickup apparatus 500V, and a workpiece image W1I corresponding to the virtual workpiece W1V. The workpiece image W1I includes images O1I and O2I corresponding to the virtual imaging targets O1V and O2V.

The teaching point selection area 20 displays a list of names assigned to the teaching points to which the virtual robot 100V is to be operated. In the teaching point selection area 20, addition and deletion of the teaching points can be performed. In the example of FIGS. 4 to 6, names "P1", "P2", and "P3" of the three teaching points that have been already registered are displayed in the teaching point selection area 20. To be noted, the names of the teaching points may be freely given by the user, or may be automatically determined. In the description below, the three teaching points will be referred to as teaching points P1, P2, and P3 for the sake of convenience of description. In the teaching point selection area 20, the name of a currently selected teaching point is displayed in an emphasized manner.

In the example of FIG. 4, the teaching point P1 is selected. The teaching point P1 is coordinate information of the basic orientation of the virtual robot 100V. The teaching point P1 is generated in the robot 100 that is an actual apparatus for keeping the robot 100 standing by until the workpiece W1 is conveyed to a predetermined position.

In the example of FIG. 5, the teaching point P2 is selected. The teaching point P2 is coordinate information of an orientation of the virtual robot 100V at the time when the virtual image pickup apparatus 500V virtually images the virtual imaging target O1V. The teaching point P2 is generated for controlling the orientation of the robot 100 that is an actual apparatus such that the imaging target O1 is within the field of view, that is, the imaging region of the image pickup apparatus 500.

In the example of FIG. 6, the teaching point P3 is selected. The teaching point P3 is coordinate information of an orientation of the virtual robot 100V at the time when the virtual image pickup apparatus 500V virtually images the virtual imaging target O2V The teaching point P3 is generated for controlling the orientation of the robot 100 that is an actual apparatus such that the imaging target O2 is within the field of view that is, the imaging region of the image pickup apparatus 500.

Here, virtual imaging by the virtual image pickup apparatus 500V refers to the CPU 311 obtaining two-dimensional image data in the field of view, that is, the imaging region of the virtual image pickup apparatus 500V by calculation. That is, the virtual imaging operation by the virtual image pickup apparatus 500V is a simulated operation imitating the actual imaging operation by the image pickup apparatus 500.

The teaching point information display area 30 includes a plurality of boxes 31 to which coordinate information of the teaching point selected in the teaching point selection area 20 can be input. In addition, the teaching point information display area 30 includes a box 32 to which setting information related to the virtual imaging operation by the virtual image pickup apparatus 500V associated with the selected teaching point. That is, in the first embodiment, the teaching point information display area 30 is an image for receiving input of the setting information. In the first embodiment, information of the field angle (zoom magnification) of the virtual image pickup apparatus 500V can be input to the box 32. New information can be input to the boxes 31 and 32, and information already input to the boxes 31 and 32 can be also edited.

In the teaching point information display area 30 in FIGS. 4 to 6, a generic name "Coordinate Information" is displayed in an area including a plurality of boxes 31 to which coordinate information of the teaching point is input, and a generic name "Camera Information" is displayed in an area including the box 32 to which the setting information is input.

In the example of FIGS. 4 to 6, in the teaching point information display area 30, angle information of the virtual joints J1V to J6V can be input as the coordinate information of each of the teaching points P1 to P3. In the example of FIGS. 4 to 6, names "J1" to "J6" are given to the plurality of boxes 31 to which the angle information of the virtual joints J1V to J6V is to be input such that the plurality of boxes 31 are easily recognizable by the user. To be noted, the coordinate information of the teaching point is not limited to the angle information of the virtual joints J1V to J6V, and for example, position/orientation information of a tool center point: TCP defined to move in an interlocked manner with the virtual link 116V may be input.

In the example of FIG. 4, as the angle information of the virtual joints J1V to J6V in the teaching point P1, 0.000° is input in the box 31 of J1, 0.000° is input in the box 31 of J2, 0.000° is input in the box 31 of J3, 0.000° is input in the box 31 of J4, −90.000° is input in the box 31 of J5, and 0.000° is input in the box 31 of J6. In addition, in the example of FIG. 4, 1.0 is input in the box 32 as information of the field angle, that is, the zoom magnification of the virtual image pickup apparatus 500V associated with the teaching point P1.

In the example of FIG. 5, as the angle information of the virtual joints J1V to J6V in the teaching point P2, −31.617° is input in the box 31 of J1, 25.852° is input in the box 31 of J2, 46.742° is input in the box 31 of J3, −35.882° is input in the box 31 of J4, −75.749° is input in the box 31 of J5, and −83.148° is input in the box 31 of J6. In addition, in the example of FIG. 5, 1.0 is input in the box 32 as information of the field angle, that is, the zoom magnification of the virtual image pickup apparatus 500V associated with the teaching point P2.

In the example of FIG. 6, as the angle information of the virtual joints J1V to J6V in the teaching point P3, 59.331° is input in the box 31 of J1, 12.298° is input in the box 31 of J2, −17.452° is input in the box 31 of J3, −86.950° is input in the box 31 of J4, 59.468° is input in the box 31 of J5, and −92.974° is input in the box 31 of J6. In addition, in the example of FIG. 6, 1.0 is input in the box 32 as information of the field angle, that is, the zoom magnification of the virtual image pickup apparatus 500V associated with the teaching point P3.

The CPU 311 performs simulation to operate the virtual robot 100V to the teaching point selected in the teaching point selection area 20, and draws a corresponding robot image 100I in the three-dimensional space display area 10 on the basis of the orientation of the virtual robot 100V. In the example of FIG. 4, in the three-dimensional space display area 10, the robot image 100I is drawn in an orientation corresponding to the orientation of the virtual robot 100V operated to the teaching point P1. In the example of FIG. 5, in the three-dimensional space display area 10, the robot image 100I is drawn in an orientation corresponding to the orientation of the virtual robot 100V operated to the teaching point P2. In the example of FIG. 6, in the three-dimensional space display area 10, the robot image 100I is drawn in an orientation corresponding to the orientation of the virtual robot 100V operated to the teaching point P3.

In addition, the CPU 311 displays, in the imaging region display area 40, an image obtained by a virtual imaging operation by the virtual image pickup apparatus 500V based on the setting information in a state in which the virtual image pickup apparatus 500V has been moved in an interlocked manner with the virtual robot 100V operated to the selected teaching point.

In the example of FIG. 4, the CPU 311 displays, in the imaging region display area 40, an image 41 obtained by the virtual imaging operation by the virtual image pickup apparatus 500V on the basis of the information of a zoom magnification of 1.0× in a state in which the virtual image pickup apparatus 500V has been moved in an interlocked manner with the virtual robot 100V operated to the teaching point P1.

In the example of FIG. 5, the CPU 311 displays, in the imaging region display area 40, an image 42 obtained by the virtual imaging operation by the virtual image pickup apparatus 500V on the basis of the information of a zoom magnification of 1.0× in a state in which the virtual image pickup apparatus 500V has been moved in an interlocked manner with the virtual robot 100V operated to the teaching point P2. The image 42 includes the image O1I corresponding to the virtual imaging target O1V.

In the example of FIG. 6, the CPU 311 displays, in the imaging region display area 40, an image 43 obtained by the virtual imaging operation by the virtual image pickup apparatus 500V on the basis of the information of a zoom magnification of 1.0× in a state in which the virtual image pickup apparatus 500V has been moved in an interlocked manner with the virtual robot 100V operated to the teaching point P3. The image 43 includes the image O2I corresponding to the virtual imaging target O2V.

Figure 7:
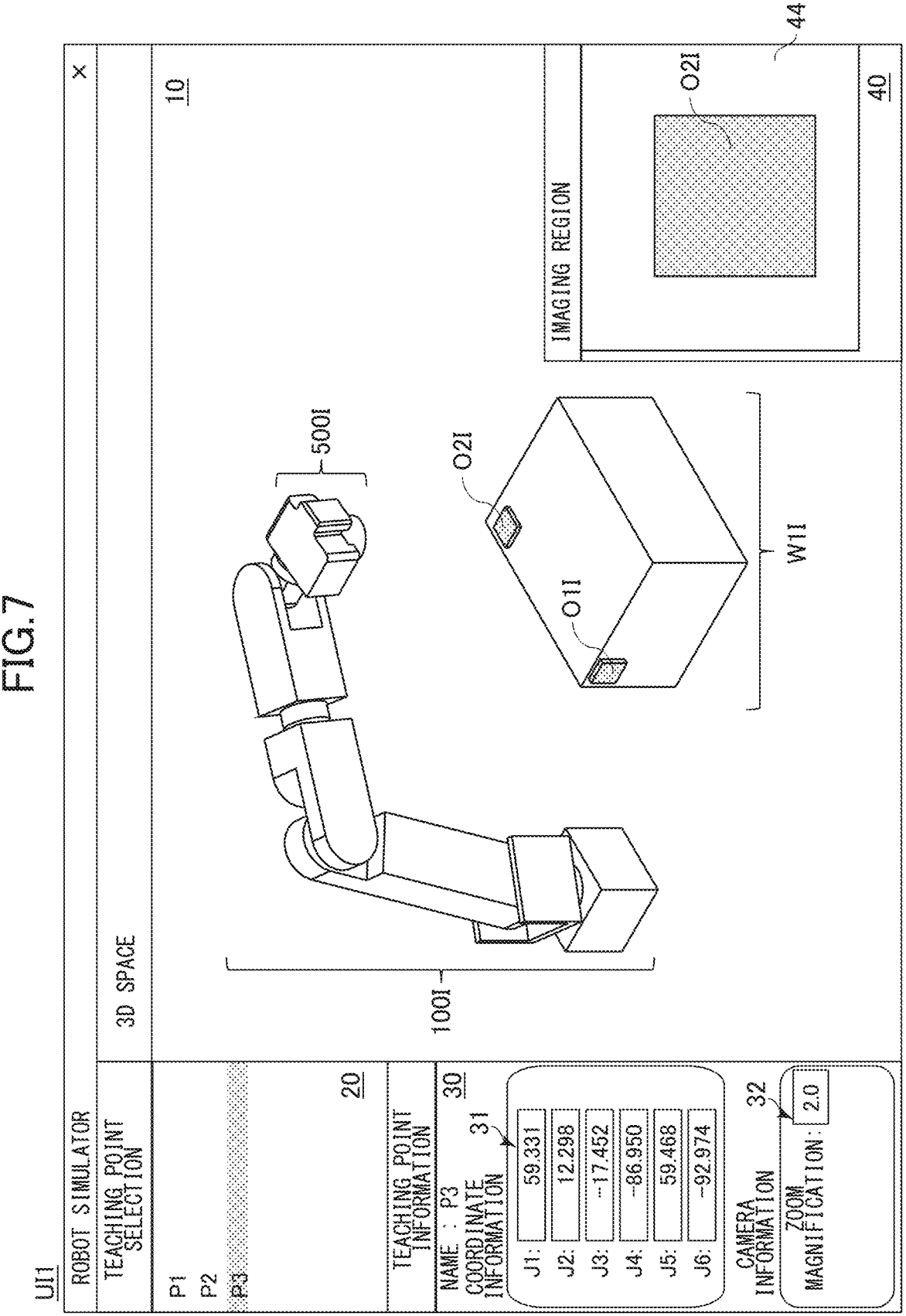
FIG. 7 is an explanatory diagram of an example of a UI window according to the first embodiment.

The information of the boxes 31 and 32 can be modified by the user as described above. FIG. 7 is an explanatory diagram of an example of the UI window UI1 according to the first embodiment. FIG. 7 illustrates the UI window UI1 of the case where the zoom magnification in FIG. 6 is changed from 1.0× to 2.0×. The CPU 311 displays, in the imaging region display area 40, an image 44 obtained by the virtual imaging operation by the virtual image pickup apparatus 500V on the basis of the information of a zoom magnification of 2.0× in a state in which the virtual image pickup apparatus 500V has been moved in an interlocked manner with the virtual robot 100V operated to the teaching point P3. In this manner, the image 44 in which the virtual imaging target O2V is displayed in a sufficient size without can be obtained changing the information of the teaching point P3. That is, the image 44 includes the image O2I of the virtual imaging target O2V. The size of the image O2I in the image 44 is larger than the size of the image O2I in the image 43.

As described above, the user can efficiently design an imaging operation satisfying a desired condition while changing the setting information of the virtual image pickup apparatus 500V. In addition, the user can design the teaching data while simultaneously looking at the robot image 100I, the camera image 500I, and each of the images 41 to 44 obtained by virtual imaging operation. To be noted, the imaging does not have to be performed in all the teaching points. Therefore, the teaching data may be generated by associating teaching points that need imaging, such as the teaching points P2 and P3, with setting information such as the zoom magnification.

The teaching points of the virtual robot 100V and setting information of the virtual image pickup apparatus 500V associated with the teaching points generated by the information processing apparatus 300 in this manner can be stored as teaching data in, for example, the HDD 314. In addition, this teaching data can be transmitted to the control apparatus 200. In the control apparatus 200, the teaching data is used as the teaching points of the robot 100 and the setting information of the image pickup apparatus 500 associated with the teaching points. As a result of this, the control apparatus 200 can control the image pickup apparatus 500 in association with the operation of the robot 100. For example, the control apparatus 200 can control the robot 100 on the basis of the teaching points P2, and control the image pickup apparatus 500 on the basis of, for example, the setting information of a zoom magnification of 1.0× associated with the teaching point P2. In addition, for example, the control apparatus 200 can control the robot 100 on the basis of the teaching point P3, and control the image pickup apparatus 500 on the basis of, for example, the setting information of a zoom magnification of 2.0× associated with the teaching points P3.

As described above, according to the first embodiment, in the simulation, the CPU 311 associates the setting information of the virtual image pickup apparatus 500V with the teaching points of the virtual robot 100V, and therefore the user can efficiently design the operation of the robot 100 and the operation of the image pickup apparatus 500.

In addition, since the CPU 311 receives the input of the setting information to be associated with the selected teaching point via the UI window UI1, the user can further efficiently design the operation of the robot 100 and the operation of the image pickup apparatus 500.

In addition, in the first embodiment, the CPU 311 displays the images 41 to 44 on the display 302, that is, in the UI window UI1 on the display 302. Therefore, the user can easily recognize what image can be obtained in correspondence with the teaching points of the virtual robot 100V and the setting information of the virtual image pickup apparatus 500V, and the operation of the robot 100 and the operation of the image pickup apparatus 500 can be further efficiently designed.

In addition, in the first embodiment, the CPU 311 displays the robot image 100I corresponding to the virtual robot 100V having been operated to the selected teaching point on the display 302, that is, in the UI window UI1 on the display 302. At this time, the workpiece image W1I corresponding to the virtual workpiece W1V is also preferably displayed. As a result of this, the user can easily recognize which orientation the robot 100 takes with respect to the workpiece W1, and therefore the designing can be performed further efficiently.

Further, in the first embodiment, the CPU 311 also displays a camera image 500I corresponding to the virtual image pickup apparatus 500V that moves in an interlocked manner with the virtual robot 100V on the display 302, that is, in the UI window UI1 on the display 302. As a result of this, the user can easily recognize which orientation the image pickup apparatus 500 takes with respect to the workpiece W1, and therefore the designing can be performed further efficiently.

In addition, in many cases, a plurality of teaching points are set. In the first embodiment, the CPU 311 is capable of associating each of the plurality of teaching points Pb to P3 with unique setting information. For example, as illustrated in FIG. 7, for the teaching point P3, the zoom magnification of the virtual image pickup apparatus 500V can be set to a value different from that for the other teaching points P1 and P2, for example, to 2.0×. As a result of this, the user can perform designing further efficiently. To be noted, unique setting information is set in association with each of the plurality of teaching points P1 to P3, and the content of each piece of setting information is freely set by the user. Therefore, the content of each piece of setting information may be each different, or the same.

Second Embodiment

Figure 8:
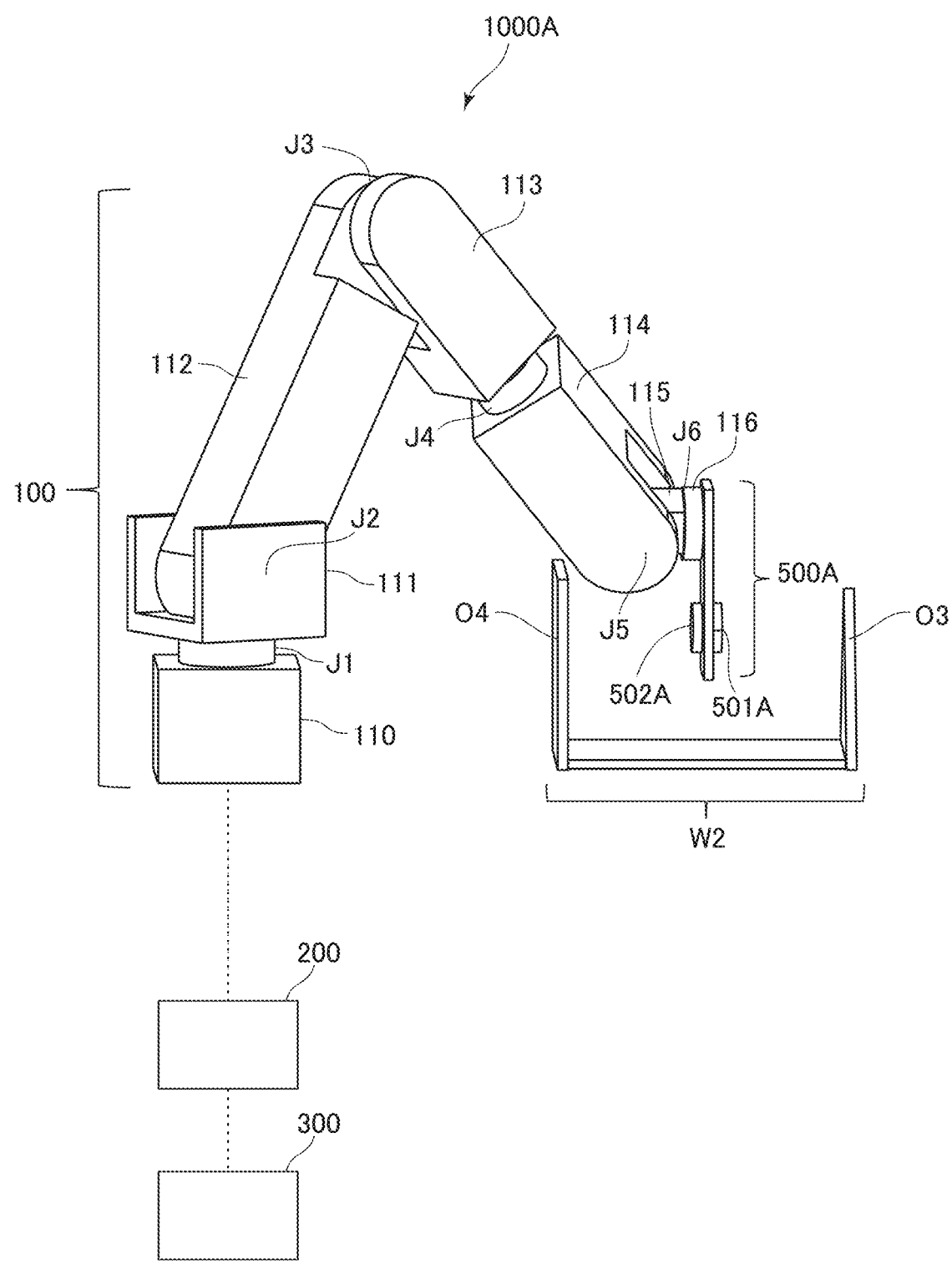
FIG. 8 is an explanatory diagram of a robot system according to a second embodiment.

A second embodiment will be described. FIG. 8 is an explanatory diagram of a robot system 1000A according to the second embodiment. To be noted, in the second embodiment, description of substantially the same elements as in the first embodiment will be simplified or omitted. The configuration of the robot system 1000A in the second embodiment is the same as that described in the first embodiment except for the image pickup apparatus. That is, in the second embodiment, an image pickup apparatus 500A is provided in place of the image pickup apparatus 500 illustrated in FIG. 1. In addition, although a case where an imaging target is imaged to read information such as a barcode has been described above in the first embodiment, the configuration is not limited to this. In the second embodiment, a case where the imaging target is imaged to recognize the shape of a product will be described as an example.

The image pickup apparatus 500A includes two image pickup portions 501A and 502A as an example of a plurality of image pickup portions. The image pickup portions 501A and 502A have different imaging directions. In the second embodiment, the field of view, that is, the imaging region is different. The image pickup portion 502A is capable of imaging an opposite side to the image pickup portion 501A. The image pickup portion 501A is an example of a first camera, and the image pickup portion 502A is an example of a second camera. The image pickup apparatus 500A is, for example, a mobile terminal such as a smartphone, the image pickup portion 501A is a so-called front camera, and the image pickup portion 502A is a so-called rear camera. In the case where the front camera captures an image in a first direction, the rear camera captures an image in a second direction opposite to the first direction. The image pickup apparatus 500A can selectively image different image regions by the two image pickup portions 501A and 502A.

The image pickup portions 501A and 502A of the image pickup apparatus 500A are each a digital camera, and each include a lens, an image sensor, and so forth. The image pickup portions 501A and 502A each image an object present in the field of view, that is, in the imaging region in accordance with the setting information, and transmits image data obtained by this imaging to the control apparatus 200.

A workpiece W2 is disposed near the robot 100. The workpiece W2 is disposed in the vicinity of the robot 100 in a position and orientation predetermined with respect to the robot 100. The workpiece W2 includes a plurality of imaging targets O3 and O4. The imaging targets O3 and O4 are a pair of side plates arranged at an interval so as to oppose each other. The imaging target O3 is a side plate having an outer shape that is triangular in plan view, and the imaging target O4 is a side plate having an outer shape that is quadrangular in plan view.

Figure 9:
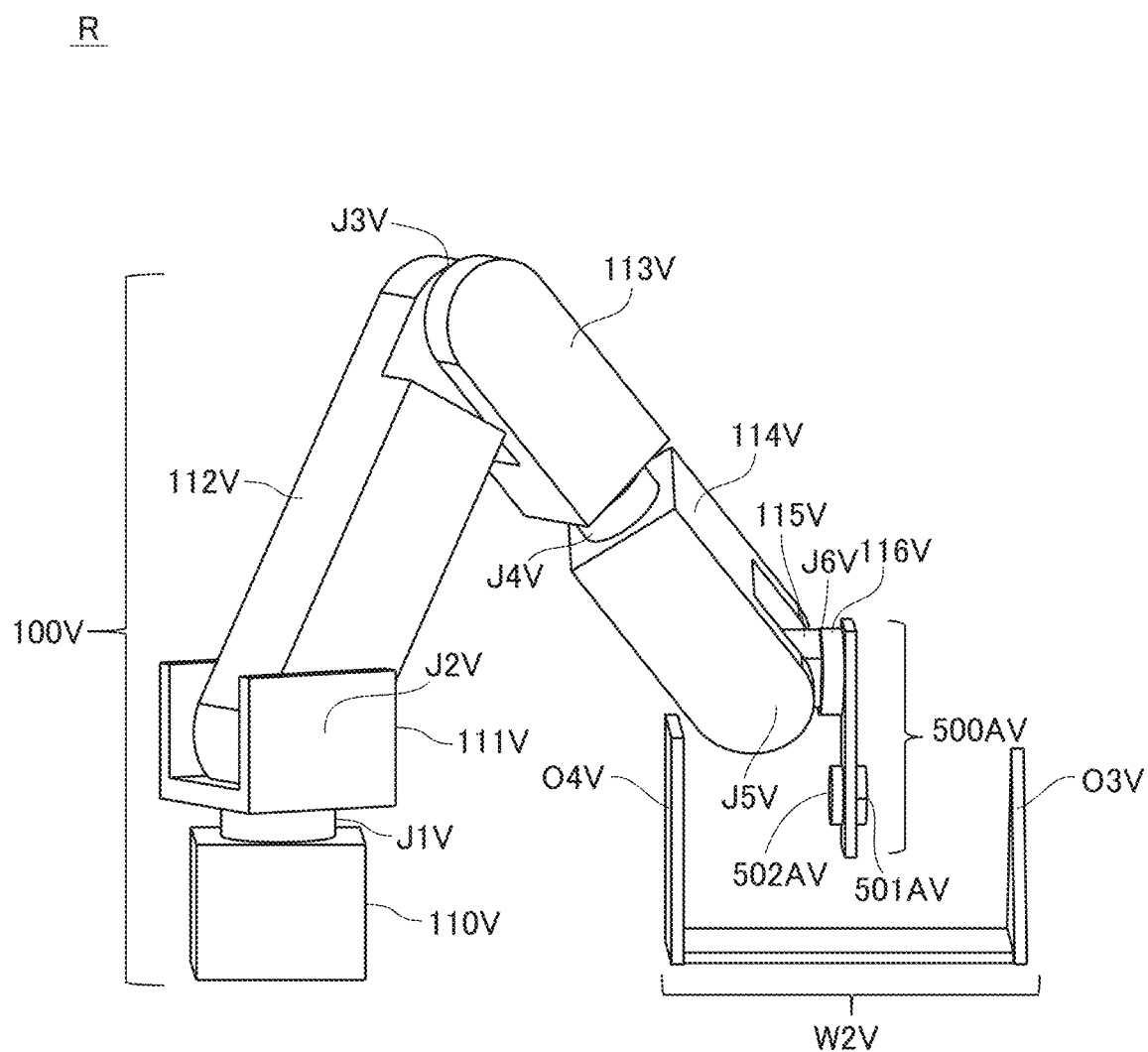
FIG. 9 is an explanatory diagram of a virtual space based on simulation by an information processing apparatus according to the second embodiment.

FIG. 9 is an explanatory diagram of a virtual space R for simulation by the information processing apparatus 300 according to the second embodiment. The CPU 311 defines the virtual space R illustrated in FIG. 9 as a virtual environment. Virtual objects in the virtual space R are defined by three-dimensional model data, for example, CAD data, and are illustrated as visible structures in FIG. 9 for the sake of convenience.

The virtual objects defined in the virtual space R illustrated in FIG. 9 will be described. In the virtual space R, a virtual robot 100V, a virtual image pickup apparatus 500AV incorporated in a virtual mobile terminal, and a virtual workpiece W2V are defined. The virtual robot 100V is defined by three-dimensional model data imitating the robot 100 illustrated in FIG. 1. The virtual image pickup apparatus 500AV is defined by three-dimensional model data imitating the image pickup apparatus 500A illustrated in FIG. 8. The virtual workpiece W2V is defined by three-dimensional model data imitating the workpiece W2 illustrated in FIG. 8. The virtual workpiece W2V includes virtual imaging targets O3V and O4V imitating the imaging targets O3 and O4 illustrated in FIG. 8. The virtual space R illustrated in FIG. 9 is displayed as a still image or a moving image on the display 302 illustrated in FIG. 2A.

The virtual image pickup apparatus 500AV is defined to be associated with the virtual link 116V of the virtual robot 100V and move in an interlocked manner with the virtual link 116V That is, when simulating the virtual link 116V to move in the virtual space R, the CPU 311 performs simulation such that the virtual image pickup apparatus 500AV moves in an interlocked manner with the virtual link 116V while maintaining the relative position and orientation thereof with respect to the virtual link 116V in the virtual space R.

The virtual image pickup apparatus 500AV includes two virtual image pickup portions 501AV and 502AV as an example of a plurality of virtual image pickup portions. The virtual image pickup portion 501AV is an example of a first virtual camera, and the virtual image pickup portion 502AV is an example of a second virtual camera. The virtual image pickup portions 501AV and 502AV have different virtual imaging directions. In the second embodiment, the virtual field of view, that is, the virtual imaging region is different. The virtual image pickup portion 502AV is capable of imaging an opposite side to the virtual image pickup portion 501AV. The virtual image pickup apparatus 500AV is, for example, a virtual smartphone, the virtual image pickup portion 501AV is a virtual front camera, and the virtual image pickup portion 502AV is a virtual rear camera. In the case where the virtual image pickup portion 501AV captures an image in a first direction, the virtual image pickup portion 502AV captures an image in a second direction opposite to the first direction. The virtual image pickup apparatus 500AV can selectively image different virtual imaging regions by the two virtual image pickup portions 501AV and 502AV.

The CPU 311 executes the following information processing method, that is, simulation by executing the program 350. In the description below, it is assumed that data of two teaching points are set in advance in the information processing apparatus 300 as a plurality of teaching points. That is, the data of the two teaching points are stored in the HDD 314. In addition, the setting information of the image pickup apparatus 500A, that is, the setting information of the virtual image pickup apparatus 500AV are set in association with each of the plurality of teaching points by the processing by the CPU 311 that will be described later.

Figure 10:
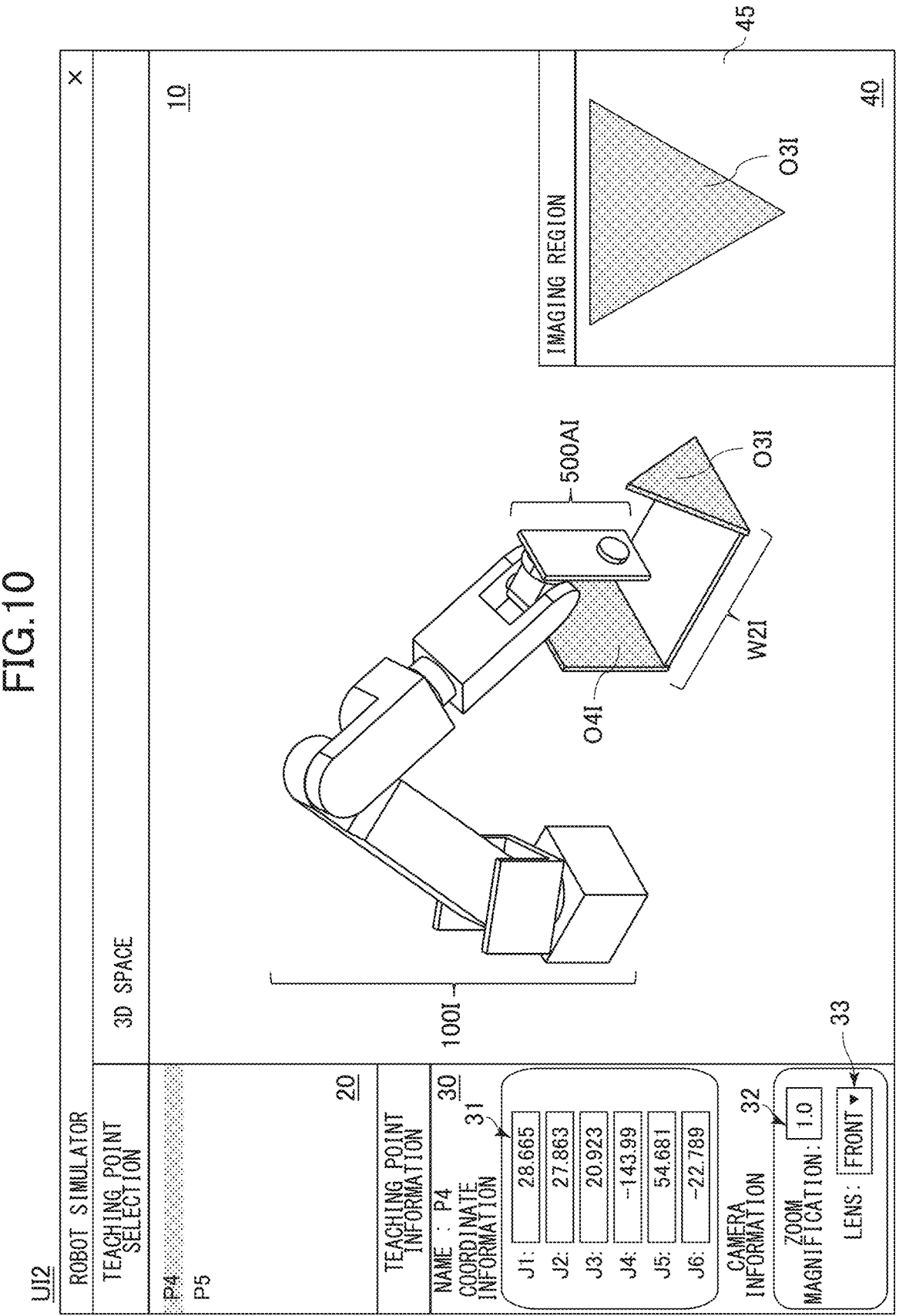
FIG. 10 is an explanatory diagram of an example of a UI window according to the second embodiment.
Figure 11:
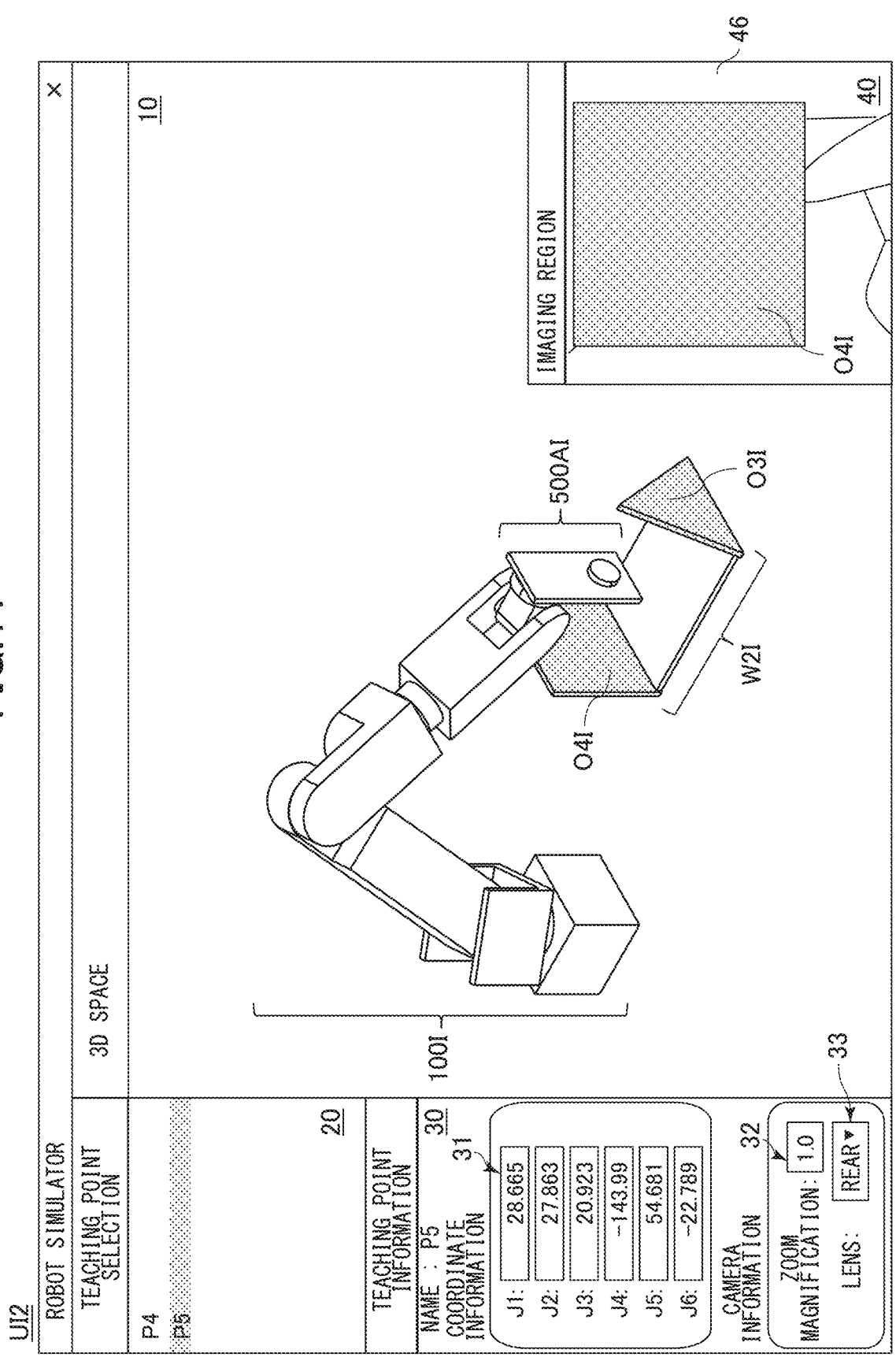
FIG. 11 is an explanatory diagram of an example of a UI window according to the second embodiment.

FIGS. 10 and 11 are explanatory diagrams of an example of a UI window UI2 according to the second embodiment. When the CPU 311 executes the program 350, the CPU 311 displays, on the display 302, the UI window UI2 serving as an example of a UI image as illustrated in FIG. 10 or 11. In the second embodiment, the CPU 311 receives input and selection from a user via the UI window UI2. To be noted, although the input from the user via the UI window UI2 can be performed by using the keyboard 303 and the mouse 304, the configuration is not limited to this. In addition, although the selection by the user via the UI window UI2 can be performed by using the mouse 304, the configuration is not limited to this.

Similarly to the UI window UI1 described in the first embodiment, the UI window UI2 includes a three-dimensional space display area 10, a teaching point selection area 20, a teaching point information display area 30, and an imaging region display area 40.

The three-dimensional space display area 10 displays a robot image 100I corresponding to the virtual robot 100V, a camera image 500AI corresponding to the virtual image pickup apparatus 500AV, and a workpiece image W2I corresponding to the virtual workpiece W2V. The workpiece image W2I includes images O3I and O4I corresponding to the virtual imaging targets O3V and O4V.

The teaching point selection area 20 displays a list of names assigned to the teaching points to which the virtual robot 100V is to be operated. In the example of FIGS. 10 and 11, names "P4" and "P5" of the two teaching points that have been already registered are displayed in the teaching point selection area 20. In the description below, the two teaching points will be referred to as teaching points P4 and P5 for the sake of convenience of description. In the teaching point selection area 20, the name of a currently selected teaching point is displayed in an emphasized manner.

In the example of FIG. 10, the teaching point P4 is selected. The teaching point P4 is coordinate information of an orientation of the virtual robot 100V at the time when the virtual image pickup apparatus 500AV virtually images the virtual imaging target O3V. The teaching point P4 is generated for controlling the orientation of the robot 100 that is an actual apparatus such that the imaging target O3 is within the field of view, that is, the imaging region of the image pickup portion 501A of the image pickup apparatus 500A.

In the example of FIG. 11, the teaching point P5 is selected. The teaching point P5 is coordinate information of an orientation of the virtual robot 100V at the time when the virtual image pickup apparatus 500AV virtually images the virtual imaging target O4V. The teaching point P5 is generated for controlling the orientation of the robot 100 that is an actual apparatus such that the imaging target O4 is within the field of view that is, the imaging region of the image pickup portion 502A of the image pickup apparatus 500A. To be noted, although the information of the teaching point P4 and the information of the teaching point P5 are the same in the example of FIGS. 10 and 11, these pieces of information may be of different values.

The teaching point information display area 30 includes a plurality of boxes 31 to which coordinate information of the teaching point selected in the teaching point selection area 20 can be input similarly to the first embodiment. In addition, the teaching point information display area 30 includes boxes 32 and 33 to which setting information related to the virtual imaging operation by the virtual image pickup apparatus 500AV associated with the selected teaching point can be input. The setting information set for the virtual image pickup apparatus 500AV is the same as the setting information set by a function of the image pickup apparatus 500A that is an actual apparatus.

In the second embodiment, information of an imaging direction of the virtual image pickup apparatus 500AV can be input as setting information in the box 33. The information of the imaging direction of the virtual image pickup apparatus 500AV is information indicating which of the virtual image pickup portions 501AV and 502AV is to be used. Specifically, the information of the virtual image pickup apparatus 500AV is information indicating which of the virtual image pickup portions 501AV and 502AV is used for virtual imaging. In the example of FIGS. 10 and 11, the virtual image pickup portion 501AV is selected in the case where "FRONT" is set as the setting information, and the virtual image pickup portion 502AV is selected in the case where "REAR" is set as the setting information.

Information of the field angle (zoom magnification) of the virtual image pickup portion selected in the box 33 can be input to the box 32 as setting information. New information can be input to the boxes 31, 32 and 33, and information already input to the boxes 31, 32, and 33 can be also edited.

The CPU 311 performs simulation to operate the virtual robot 100V to the teaching point selected in the teaching point selection area 20, and draws a corresponding robot image 100I in the three-dimensional space display area 10 on the basis of the orientation of the virtual robot 100V. In the example of FIG. 10, in the three-dimensional space display area 10, the robot image 100I is drawn in an orientation corresponding to the orientation of the virtual robot 100V operated to the teaching point P4. In the example of FIG. 11, in the three-dimensional space display area 10, the robot image 100I is drawn in an orientation corresponding to the orientation of the virtual robot 100V operated to the teaching point P5.

In addition, the CPU 311 displays, in the imaging region display area 40, an image obtained by a virtual imaging operation by the virtual image pickup apparatus 500AV based on the setting information in a state in which the virtual image pickup apparatus 500AV has been moved in an interlocked manner with the virtual robot 100V operated to the selected teaching point.

In the example of FIG. 10, the CPU 311 displays, in the imaging region display area 40, an image 45 obtained by the virtual imaging operation by the virtual image pickup portion 501AV of the virtual image pickup apparatus 500AV on the basis of the information of a zoom magnification of 1.0× in a state in which the virtual image pickup apparatus 500AV has been moved in an interlocked manner with the virtual robot 100V operated to the teaching point P4. The image 45 includes the image O3I corresponding to the virtual imaging target O3V. The image O3I is recognized as a triangular image.

In the example of FIG. 11, the CPU 311 displays, in the imaging region display area 40, an image 46 obtained by the virtual imaging operation by the virtual image pickup portion 502AV of the virtual image pickup apparatus 500AV on the basis of the information of a zoom magnification of 1.0× in a state in which the virtual image pickup apparatus 500AV has been moved in an interlocked manner with the virtual robot 100V operated to the teaching point P5. The image 46 includes the image O4I corresponding to the virtual imaging target O4V. The image O4I is recognized as a quadrangular image.

The teaching points of the virtual robot 100V and setting information of the virtual image pickup apparatus 500AV associated with the teaching points generated by the information processing apparatus 300 in this manner can be stored as teaching data in, for example, the HDD 314. In addition, this teaching data can be transmitted to the control apparatus 200. In the control apparatus 200, the teaching data is used as the teaching points for the robot 100 and the setting information of the image pickup apparatus 500A associated with the teaching points. As a result of this, the control apparatus 200 can control the image pickup apparatus 500A in association with the operation of the robot 100. For example, the control apparatus 200 can control the robot 100 on the basis of the teaching points P4, and control the image pickup apparatus 500A on the basis of, for example, the setting information indicating that the image pickup portion 501A is to be used for imaging and the setting information of a zoom magnification of 1.0× associated with the teaching point P4. In addition, for example, the control apparatus 200 can control the robot 100 on the basis of the teaching point P5, and control the image pickup apparatus 500A on the basis of, for example, the setting information indicating that the image pickup portion 502A is to be used for imaging the setting information of a zoom magnification of 1.0 associated with the teaching point P5.

As described above, according to the second embodiment, the operation of the robot 100 and the operation of the image pickup apparatus 500A can be efficiently designed. In addition, the various embodiments and modification examples thereof described above may be implemented in combination with the present embodiment and/or modification examples thereof.

Third Embodiment

Figure 12:
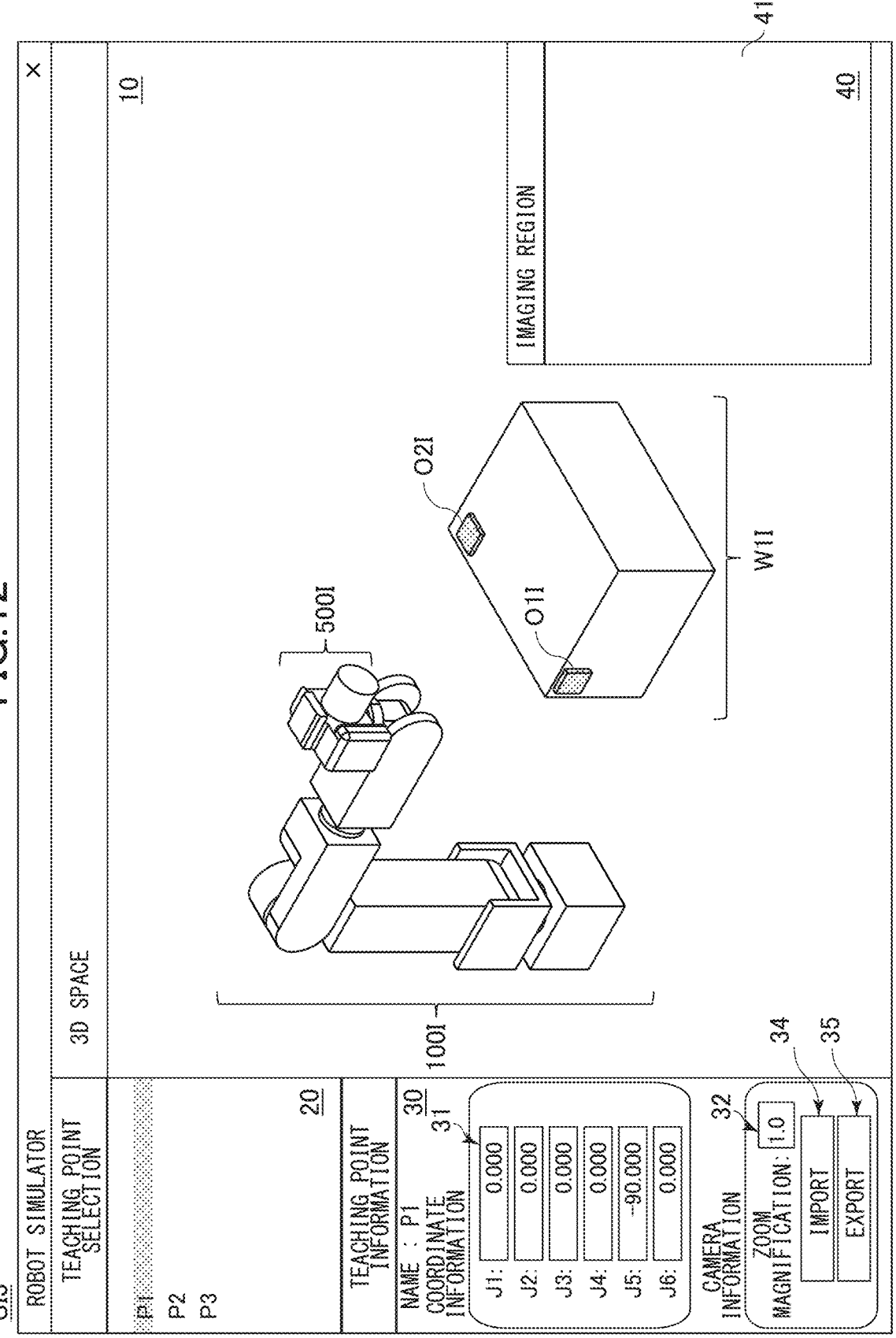
FIG. 12 is an explanatory diagram of an example of a UI window according to a third embodiment.

A third embodiment will be described. FIG. 12 is an explanatory diagram of an example of a UI window UI3 according to the third embodiment. To be noted, in the third embodiment, description of substantially the same elements as in the first embodiment will be simplified or omitted. The configuration of the robot system 1000 in the third embodiment is the same as that described in the first embodiment. When the CPU 311 executes the program 350, the CPU 311 displays, on the display 302, the UI window UI3 serving as an example of a UI image as illustrated in FIG. 12. In the third embodiment, the CPU 311 receives input and selection from a user via the UI window UI3. To be noted, although the input from the user via the UI window UI3 can be performed by using the keyboard 303 and the mouse 304, the configuration is not limited to this. In addition, although the selection by the user via the UI window UI3 can be performed by using the mouse 304, the configuration is not limited to this.

Similarly to the UI window UI1 described in the first embodiment, the UI window UI3 includes a three-dimensional space display area 10, a teaching point selection area 20, a teaching point information display area 30, and an imaging region display area 40.

In the third embodiment, the teaching point information display area 30 includes an import button 34 serving as an example of a first button, and an export button 35 serving as an example of a second button in addition to the boxes 31 and 32. The import button 34 is a button used for loading setting information from a storage portion, for example, the HDD 314. The export button 35 is a button used for storing setting information in a storage portion, for example, the HDD 314.

Figure 13:
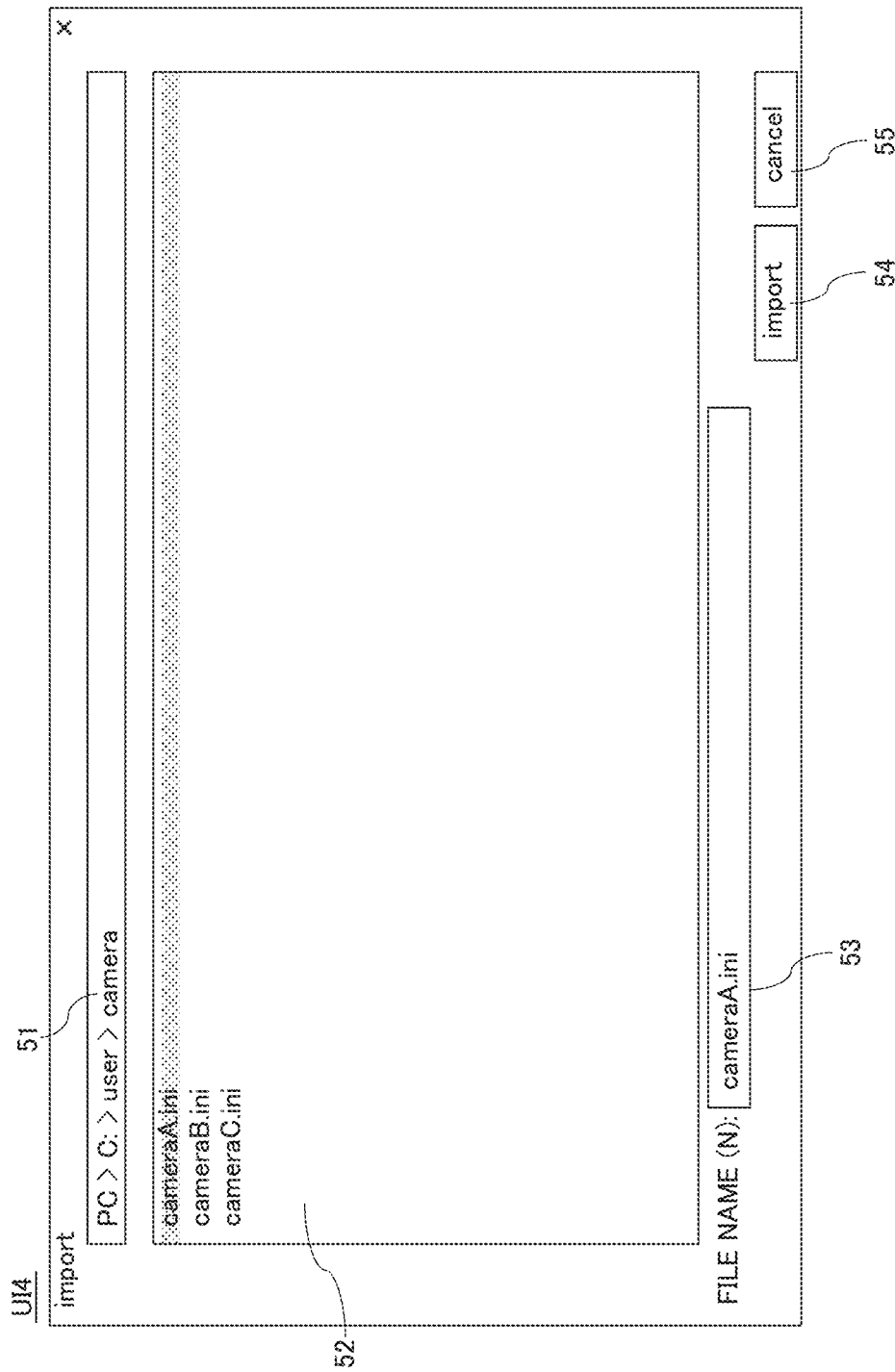
FIG. 13 is an explanatory diagram of an example of a UI window according to the third embodiment.

When the import button 34 is pressed, the CPU 311 displays a UI window UI4 illustrated in FIG. 13 on the display 302. The UI window UI4 includes an area 51 that displays the directory from which the setting information is loaded, and an area 52 displays a list of files stored in the directory displayed in the area 51. When a user selects a file name associated with a file indicating a setting candidate displayed in the area 52, the CPU 311 displays the selected file name in an area 53. For example, when a file name "cameraA.ini" indicating a setting candidate is selected by the user in the area 52, the CPU 311 displays "cameraA.ini" in the area 53.

When an execution button 54 is pressed by the user, the CPU 311 loads the selected file from the HDD 314. When a cancellation button 55 is pressed by the user, the CPU 311 does not load a file and returns to processing of displaying the UI window UI3 illustrated in FIG. 12.

Figure 14:
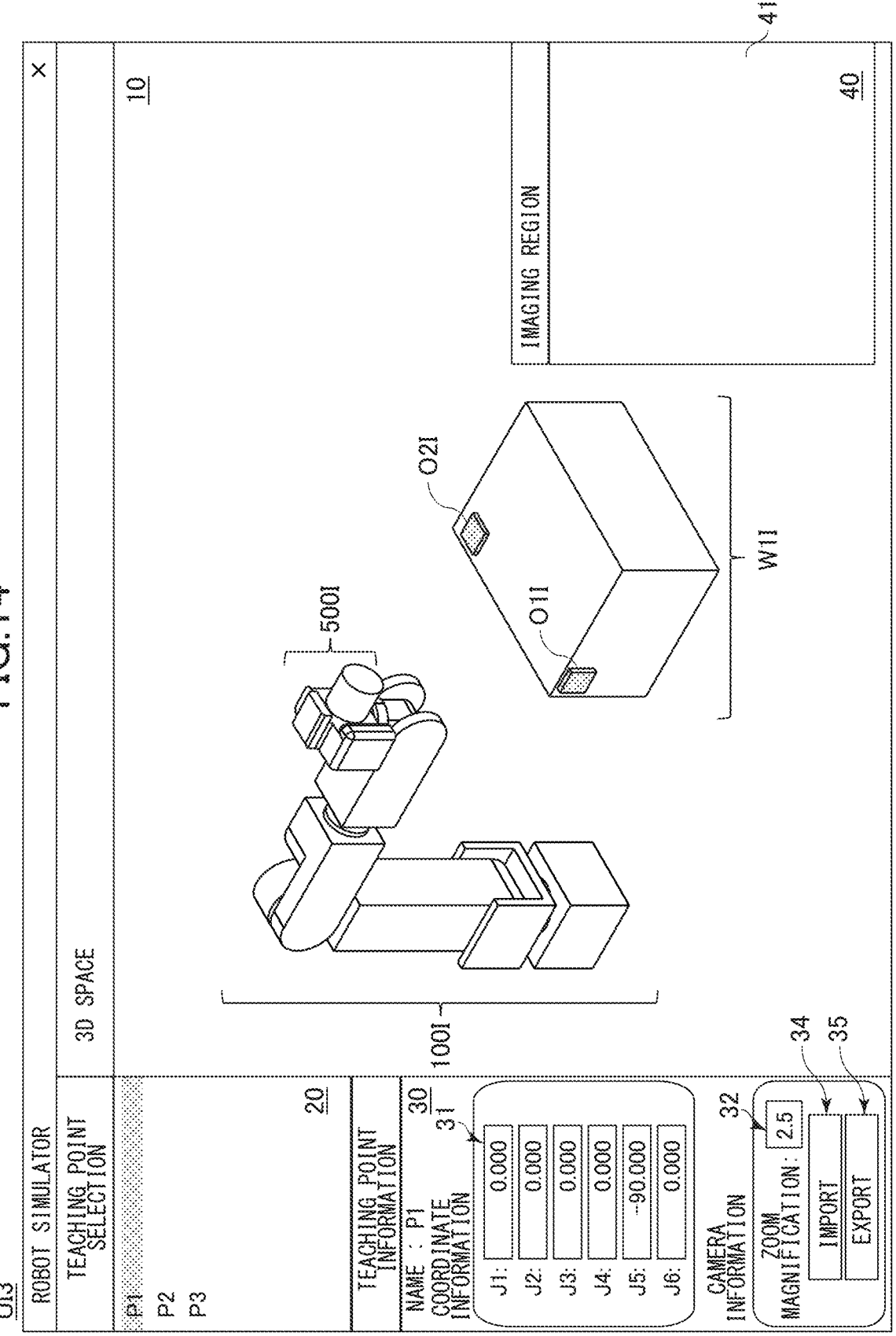
FIG. 14 is an explanatory diagram of an example of a UI window according to the third embodiment.

FIG. 14 is an explanatory diagram of an example of the UI window UI3 according to the third embodiment. When the execution button 54 of FIG. 13 is pressed, the CPU 311 reflects a value registered in the loaded file on the setting information, and changes the value of the zoom magnification in the box 32 as illustrated in FIG. 14. In the example of FIG. 14, a zoom magnification of "2.5" is displayed in the box 32.

Figure 15:
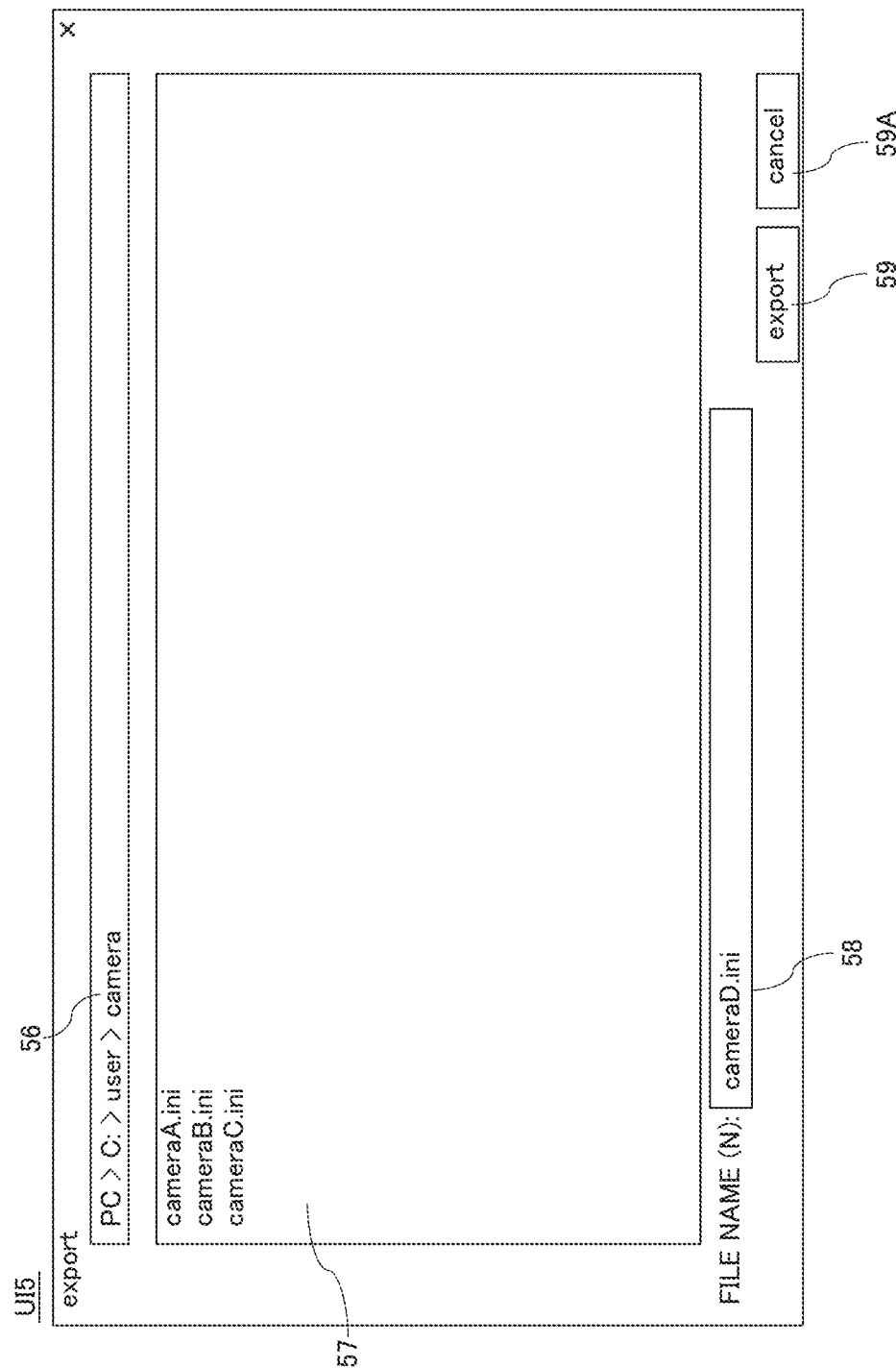
FIG. 15 is an explanatory diagram of an example of a UI window according to the third embodiment.

In addition, when the export button 35 is pressed, a UI window UI5 illustrated in FIG. 15 is displayed on the display 302. The UI window UI5 includes an area 56 that displays a directory in which setting information is to be stored, and an area 57 that displays a list of files stored in the directory displayed in the area 56.

When the user inputs a file name in an area 58 and presses an execution button 59, the CPU 311 stores, in the HDD 314, a file including information of the zoom magnification input in the teaching point information display area 30 as the setting information while giving the file a file name input in the area 58. In this case, this file is stored in the directory displayed in the area 57. For example, a file serving as a setting candidate is stored with a file name "cameraD.ini". When the user presses a cancellation button 59A, the CPU 311 does not store a file and returns to the processing of displaying the UI window UI3 illustrated in FIG. 14.

As described above, according to the third embodiment, the operation of the robot 100 and the operation of the image pickup apparatus 500 can be efficiently designed. In addition, the various embodiments and modification examples thereof described above may be implemented in combination with the present embodiment and/or modification examples thereof.

Fourth Embodiment

Figure 16:
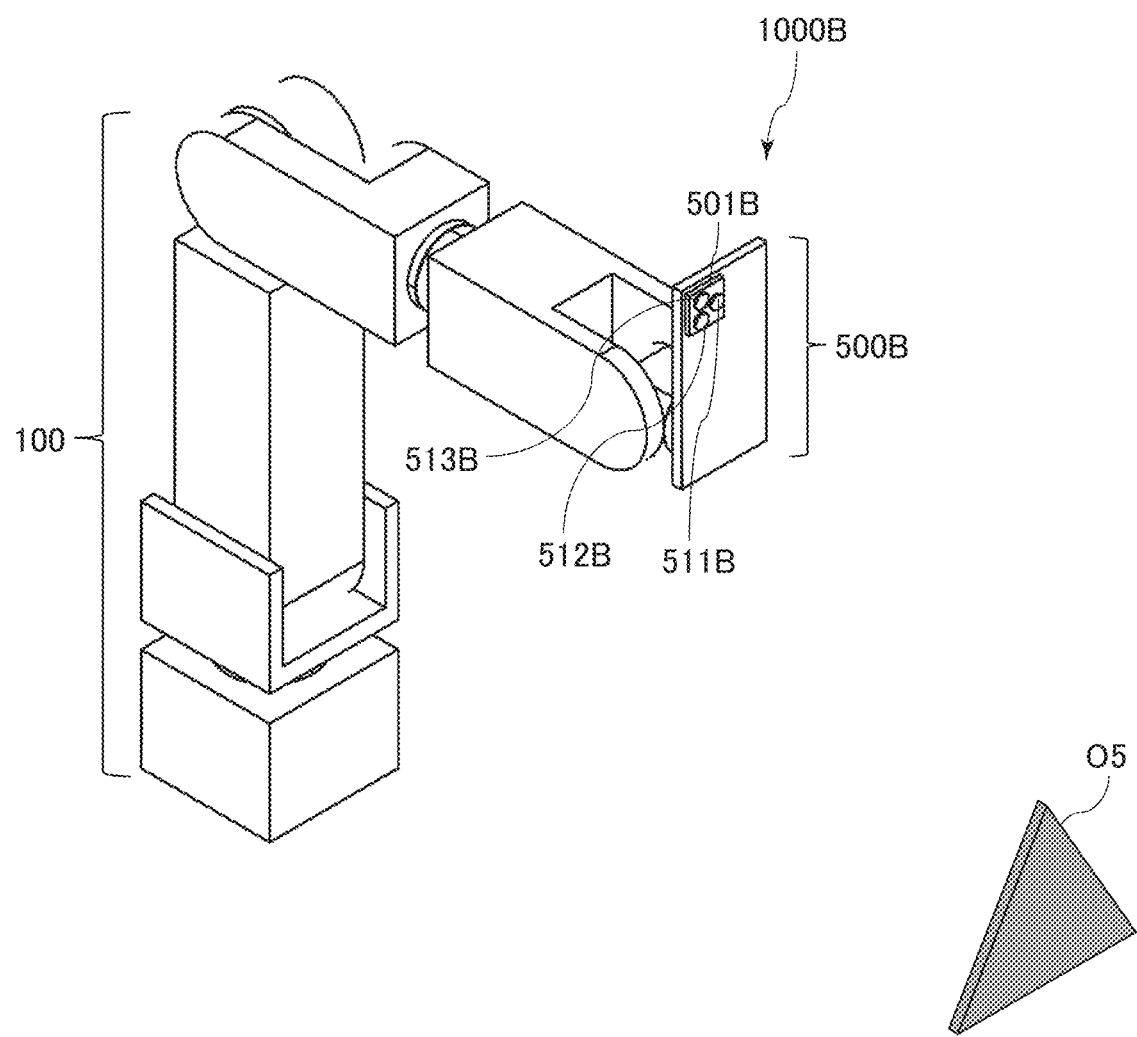
FIG. 16 is an explanatory diagram of a robot system according to a fourth embodiment.

A fourth embodiment will be described. FIG. 16 is an explanatory diagram of a robot system 1000B according to the fourth embodiment. To be noted, in the fourth embodiment, description of substantially the same elements as in the first to third embodiments described above will be simplified or omitted. The configuration of the robot system 1000B in the fourth embodiment is the same as that described in the embodiments described above except for the image pickup apparatus. That is, in the fourth embodiment, an image pickup apparatus 500B is provided in the robot 100 in place of the image pickup apparatuses 500 and 500A illustrated in FIGS. 1 and 8.

As illustrated in FIG. 16, the image pickup apparatus 500B includes an image pickup portion 501B including a plurality of lenses. The plurality of lenses each have a different focal length. In the fourth embodiment, the plurality of lenses of the image pickup portion 501B include a first lens 511B, a second lens 512B having a larger focal length than the first lens 511B, and a third lens 513B having a larger focal length than the second lens 512B. As described above, by changing the lens to be used for imaging, the image pickup portion 501B can image regions of different field angles. In addition, by switching the lenses 511B to 513B to be used, imaging at a zoom magnification of 1.0× or less, for example, imaging at 0.5× can be performed. An imaging target O5 is disposed near the robot 100. The imaging target O5 is a side plate having an outer shape that is triangular in plan view.

Figure 17:
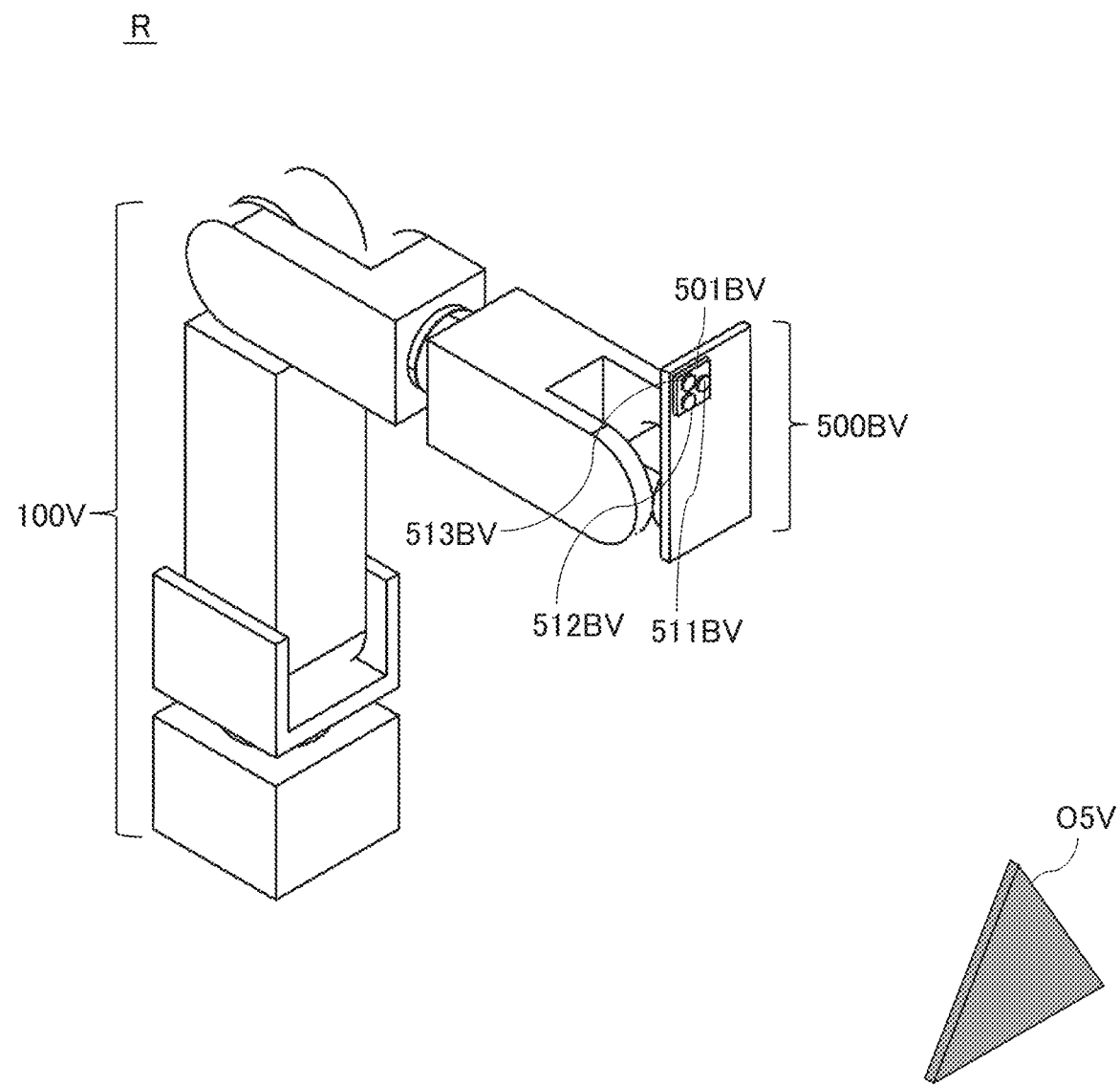
FIG. 17 is an explanatory diagram of a virtual space based on simulation by an information processing apparatus according to the fourth embodiment.

FIG. 17 is an explanatory diagram of a virtual space R for simulation by the information processing apparatus 300 according to the fourth embodiment. The CPU 311 defines the virtual space R illustrated in FIG. 17 as a virtual environment. Virtual objects in the virtual space R are defined by three-dimensional model data, for example, CAD data, and are illustrated as visible structures in FIG. 17 for the sake of convenience.

The virtual objects defined in the virtual space R illustrated in FIG. 17 will be described. In the virtual space R, a virtual robot 100V, a virtual image pickup apparatus 500BV, and a virtual imaging target O5V are defined. The virtual robot 100V is defined by three-dimensional model data imitating the robot 100 illustrated in FIG. 16. The virtual image pickup apparatus 500BV is defined by three-dimensional model data imitating the image pickup apparatus 500B illustrated in FIG. 16. A first virtual lens 511BV, a second virtual lens 512BV, and a third virtual lens 513BV are respectively defined by three-dimensional model data imitating the first lens 511B, the second lens 512B, and the third lens 513B. The virtual imaging target O5V is defined by three-dimensional model data imitating the imaging target O5 illustrated in FIG. 16. The virtual space R illustrated in FIG. 17 is displayed as a still image or a moving image on the display 302 illustrated in FIG. 2A.

The virtual image pickup apparatus 500BV is defined to be associated with the virtual link 116V of the virtual robot 100V and move in an interlocked manner with the virtual link 116V That is, when simulating the virtual link 116V to move in the virtual space R, the CPU 311 performs simulation such that the virtual image pickup apparatus 500BV moves in an interlocked manner with the virtual link 116V while maintaining the relative position and orientation thereof with respect to the virtual link 116V in the virtual space R.

The virtual image pickup apparatus 500BV is, for example, a virtual smartphone, and includes a virtual image pickup portion 501BV including the plurality of virtual lenses 511BV to 513BV. In the fourth embodiment, by switching the virtual lenses 511BV to 513BV to be used, imaging at a zoom magnification of 1.0× or less, for example, imaging at 0.5× can be performed.

The CPU 311 executes the following information processing method, that is, simulation by executing the program 350. In the description below, it is assumed that data of two teaching points are set in advance in the information processing apparatus 300 as a plurality of teaching points. That is, the data of the two teaching points are stored in the HDD 314. In addition, the setting information of the image pickup apparatus 500B, that is, the setting information of the virtual image pickup apparatus 500BV are set in association with each of the plurality of teaching points by the processing by the CPU 311 that will be described later.

Figure 18:
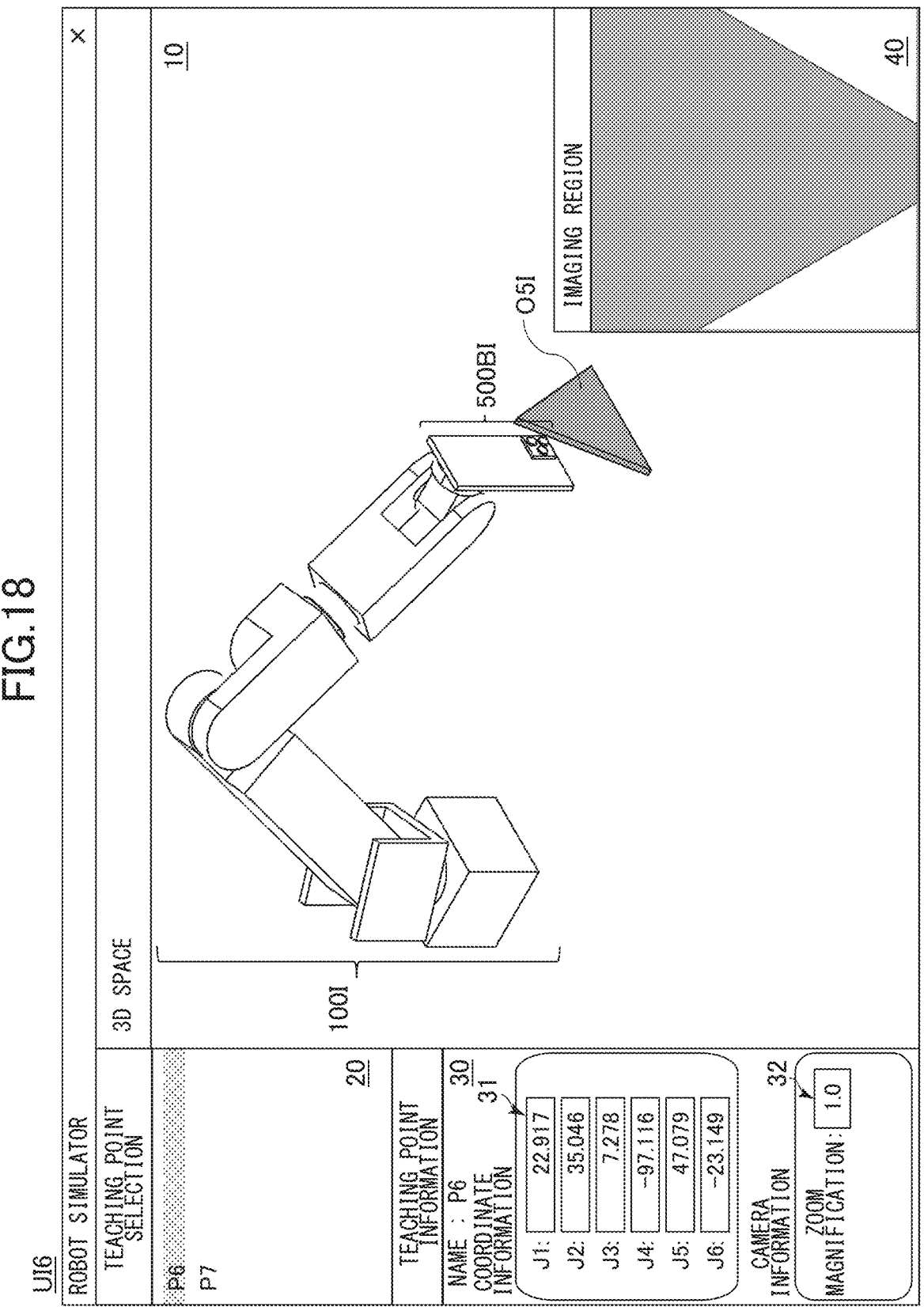
FIG. 18 is an explanatory diagram of an example of a UI window according to the fourth embodiment.
Figure 19:
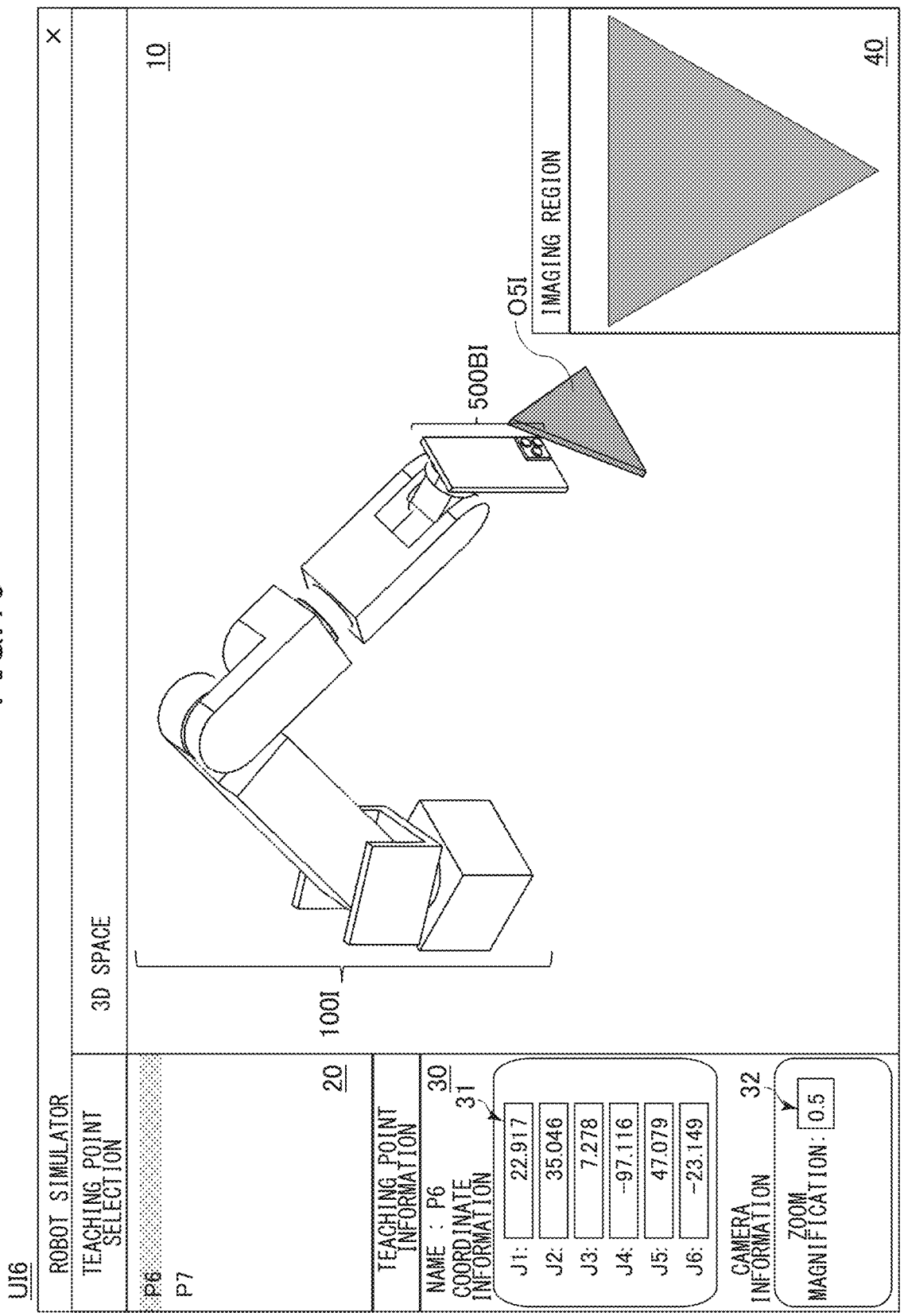
FIG. 19 is an explanatory diagram of an example of a UI window according to the fourth embodiment.

FIGS. 18 and 19 are explanatory diagrams of an example of a UI window UI6 according to the fourth embodiment. When the CPU 311 executes the program 350, the CPU 311 displays, on the display 302, the UI window UI6 serving as an example of a UI image as illustrated in FIG. 18 or 19. In the fourth embodiment, the CPU 311 receives input and selection from a user via the UI window UI6. To be noted, although the input from the user via the UI window UI6 can be performed by using the keyboard 303 and the mouse 304, the configuration is not limited to this. In addition, although the selection by the user via the UI window UI4 can be performed by using the mouse 304, the configuration is not limited to this.

Similarly to the UI window UI1 described in the first embodiment, the UI window UI6 includes a three-dimensional space display area 10, a teaching point selection area 20, a teaching point information display area 30, and an imaging region display area 40. The three-dimensional space display area 10 displays a robot image 100I corresponding to the virtual robot 100V, a camera image 500BI corresponding to the virtual image pickup apparatus 500BV, and an image O5I corresponding to the virtual imaging target O5V.

The teaching point selection area 20 displays a list of names assigned to the teaching points to which the virtual robot 100V is to be operated. In the example of FIGS. 18 and 19, names "P6" and "P7" of the two teaching points that have been already registered are displayed in the teaching point selection area 20. In the description below, the two teaching points will be referred to as teaching points P6 and P7 for the sake of convenience of description. In the teaching point selection area 20, the name of a currently selected teaching point is displayed in an emphasized manner.

In the example of FIG. 18, the teaching point P6 is selected. The teaching point P6 is coordinate information of an orientation of the virtual robot 100V at the time when the virtual image pickup apparatus 500BV virtually images the virtual imaging target O5V. The teaching point P6 is generated for controlling the orientation of the robot 100 that is an actual apparatus such that the imaging target O5 is within the imaging region of the image pickup portion 501B of the image pickup apparatus 500B. However, in the example of FIG. 18, it can be recognized that the virtual image pickup apparatus 500BV and the virtual imaging target O5V are too close to each other, and therefore the virtual imaging target O5V is not entirely displayed in the imaging region display area 40. At this time, 1.0 is set as the zoom magnification in the box 32 in the teaching point information display area 30.

In the example of FIG. 19, it can be recognized that 0.5 is set as the zoom magnification in the box 32 in the teaching point information display area 30, and the entire image of the virtual imaging target O5V is displayed in the imaging region in the imaging region display area 40. As a result of the user inputting the zoom magnification of 0.5 in the box 32, the CPU 311 performs processing to associate the zoom magnification of 0.5 with the teaching point P6. As a result of this, the control apparatus 200 can cause the image pickup apparatus 500B to accurately image the imaging target O5 in the control of the actual robot 100. In addition, since the user can cause the image pickup apparatus 500B to accurately image the imaging target O5 without recreating the data of the orientation of the robot 100, the operation of the robot 100 and the operation of the image pickup apparatus 500B can be efficiently designed.

Figure 20:
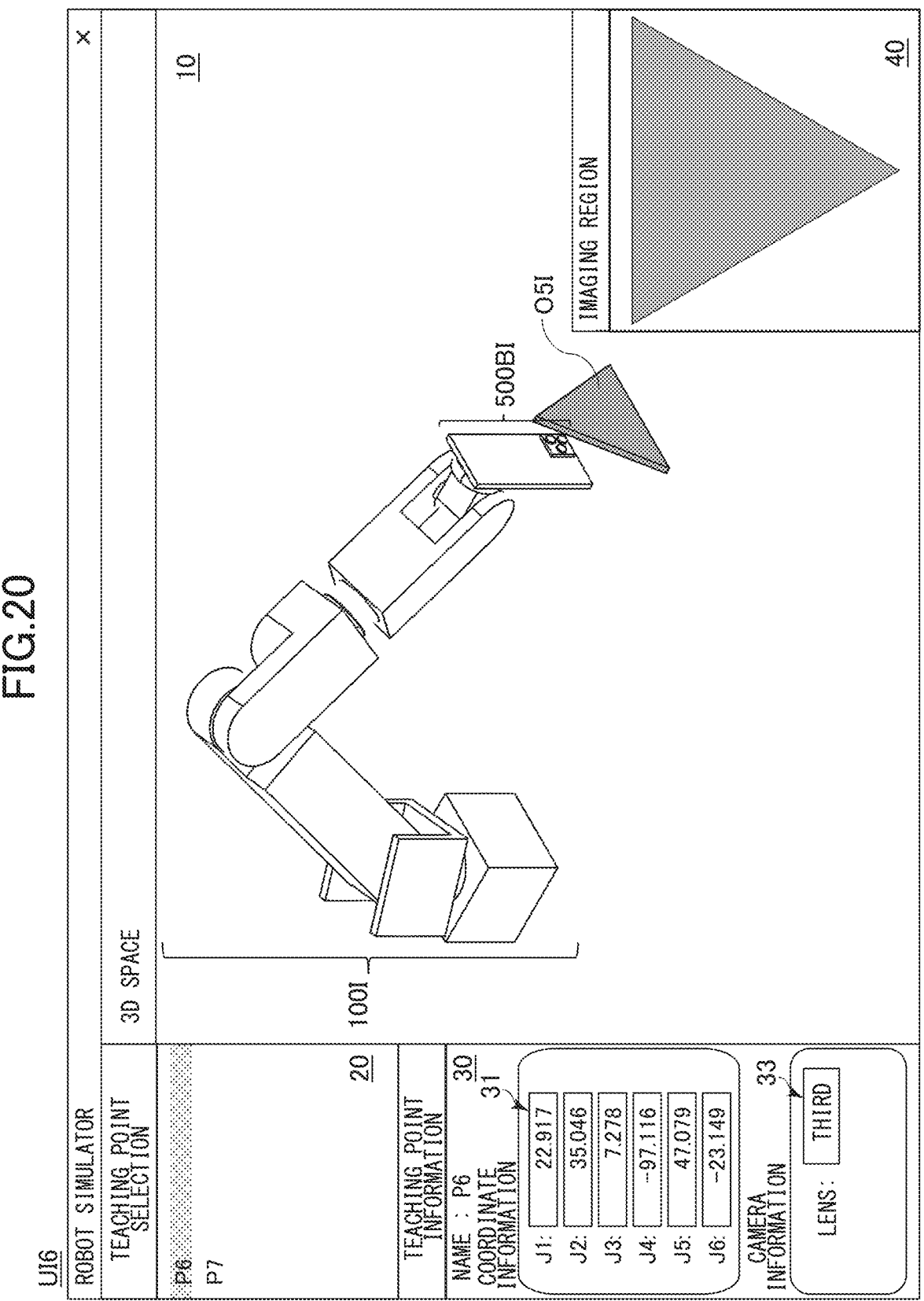
FIG. 20 is an explanatory diagram of an example of a UI window according to the fourth embodiment.

In addition, as illustrated in FIG. 20, one lens to be used for imaging may be selected by a user from among the plurality of lenses 511B to 513B included in the image pickup portion 501B. In the example of FIG. 20, in the box 33, the third lens 513B is selected. As described above, which of the plurality of lenses 511B to 513B is used for imaging by the image pickup apparatus 500B can be easily set in association with the teaching point set for the robot 100.

As described above, according to the fourth embodiment, the operation of the robot 100 and the operation of the image pickup apparatus 500B can be efficiently designed. In addition, the various embodiments and modification examples thereof described above may be implemented in combination with the present embodiment and/or modification examples thereof.

Fifth Embodiment

Figure 21:
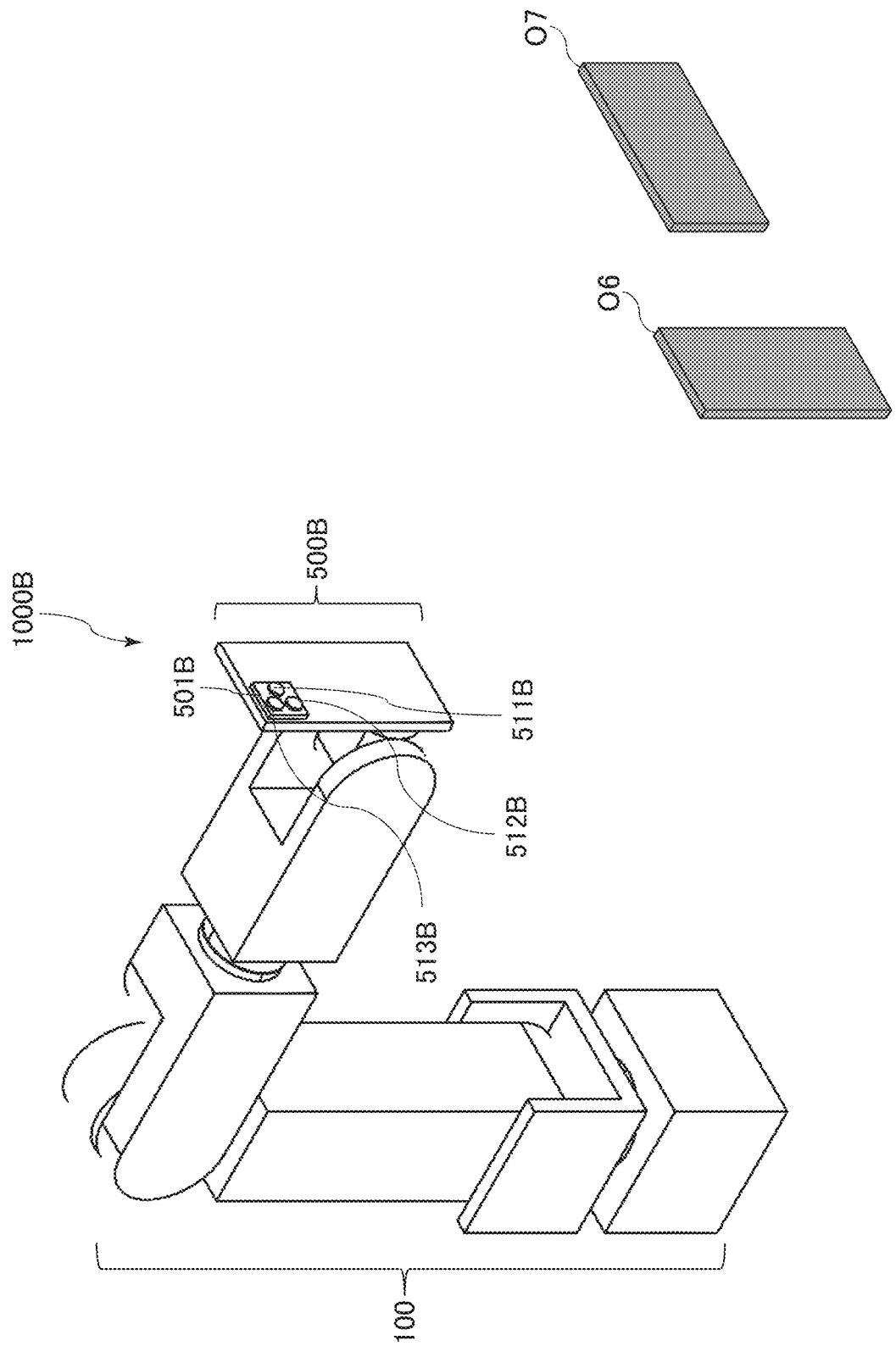
FIG. 21 is an explanatory diagram of a robot system according to a fifth embodiment.

A fifth embodiment will be described. FIG. 21 is an explanatory diagram of the robot system 1000B according to the fifth embodiment. To be noted, in the fifth embodiment, description of substantially the same elements as in the fourth embodiment described above will be simplified or omitted. The configuration of the robot system 1000B in the fifth embodiment is the same as that described in the fourth embodiment described above. In the fifth embodiment, imaging targets O6 and O7 are disposed near the robot 100 instead of the imaging target O5 illustrated in FIG. 16. The image pickup apparatus 500B described in the fourth embodiment is attached to the robot 100. The imaging targets O6 and O7 are side plates each having a rectangular shape in plan view. The imaging target O6 has a rectangular shape that is longer in the vertical direction. The imaging target O7 has a rectangular shape that is longer in the horizontal direction. In other words, the imaging target O6 is placed vertically, and the imaging target O7 is placed horizontally.

Figure 22:
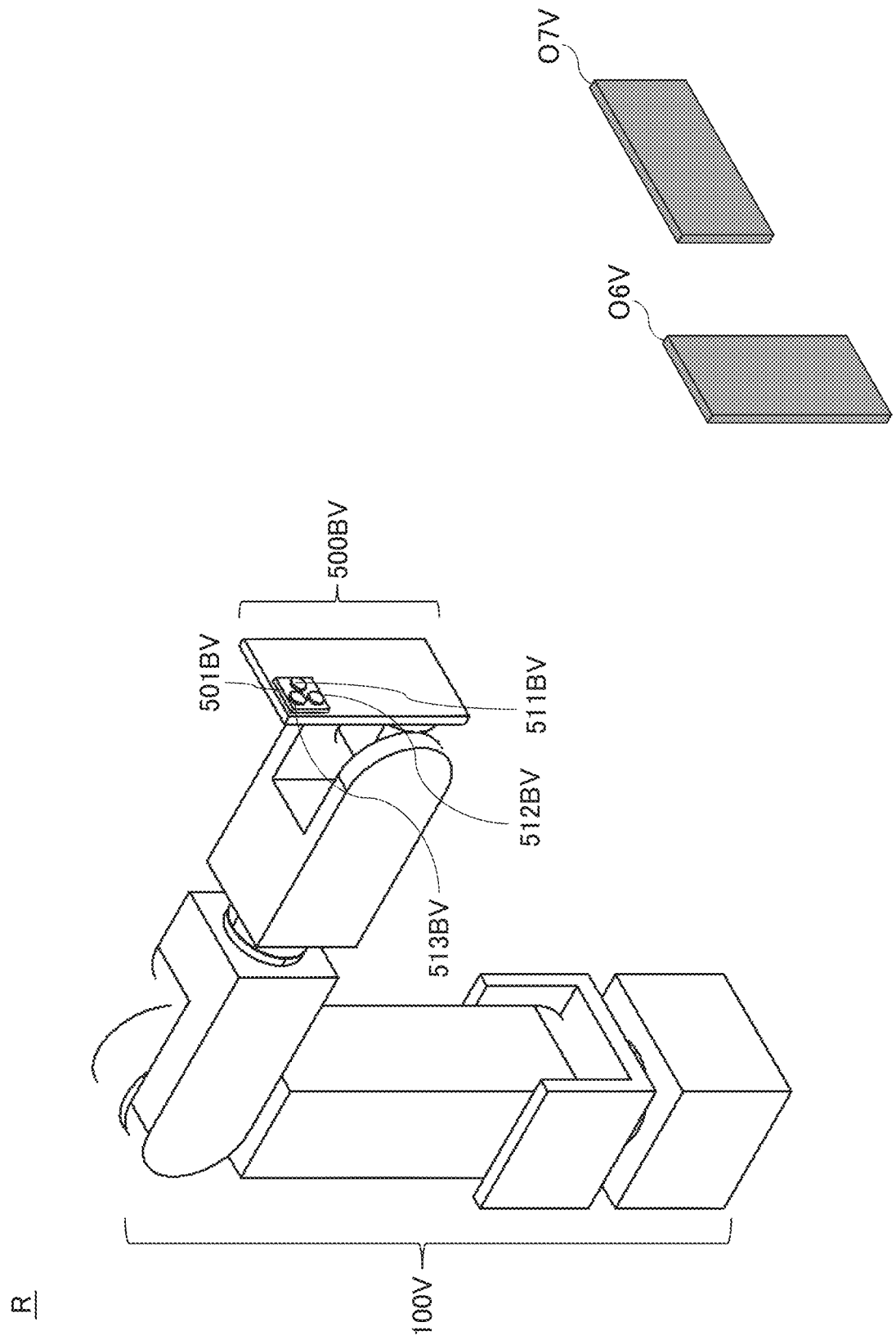
FIG. 22 is an explanatory diagram of a virtual space based on simulation by an information processing apparatus according to the fifth embodiment.

FIG. 22 is an explanatory diagram of a virtual space R for simulation by the information processing apparatus 300 according to the fifth embodiment. The CPU 311 defines the virtual space R illustrated in FIG. 22 as a virtual environment. Virtual objects in the virtual space R are defined by three-dimensional model data, for example, CAD data, and are illustrated as visible structures in FIG. 22 for the sake of convenience.

The virtual objects defined in the virtual space R illustrated in FIG. 22 will be described. In the virtual space R, a virtual robot 100V, a virtual image pickup apparatus 500BV, and virtual imaging targets O6V and O7V are defined. The virtual robot 100V is defined by three-dimensional model data imitating the robot 100 illustrated in FIG. 21. The virtual image pickup apparatus 500BV is defined by three-dimensional model data imitating the image pickup apparatus 500B illustrated in FIG. 21. The virtual imaging targets O6V and O7V are defined by three-dimensional model data imitating the imaging targets O6 and O7 illustrated in FIG. 21. The virtual space R illustrated in FIG. 22 is displayed as a still image or a moving image on the display 302 illustrated in FIG. 2A.

The virtual image pickup apparatus 500BV is defined to be associated with the virtual link 116V of the virtual robot 100V and move in an interlocked manner with the virtual link 116V That is, when simulating the virtual link 116V to move in the virtual space R, the CPU 311 performs simulation such that the virtual image pickup apparatus 500BV moves in an interlocked manner with the virtual link 116V while maintaining the relative position and orientation thereof with respect to the virtual link 116V in the virtual space R.

The virtual image pickup apparatus 500BV is, for example, a virtual smartphone, and includes a virtual image pickup portion 501BV including the plurality of virtual lenses 511BV to 513BV. In the fifth embodiment, the aspect ratio of the virtually captured image obtained by virtual imaging by the virtual image pickup apparatus 500BV is switched in accordance with the orientation of the virtual image pickup apparatus 500BV.

The CPU 311 executes the following information processing method, that is, simulation by executing the program 350. In the description below, it is assumed that data of two teaching points are set in advance in the information processing apparatus 300 as a plurality of teaching points. That is, the data of the two teaching points are stored in the HDD 314. In addition, the setting information of the image pickup apparatus 500B, that is, the setting information of the virtual image pickup apparatus 500BV are set in association with each of the plurality of teaching points by the processing by the CPU 311 that will be described later.

Figure 23:
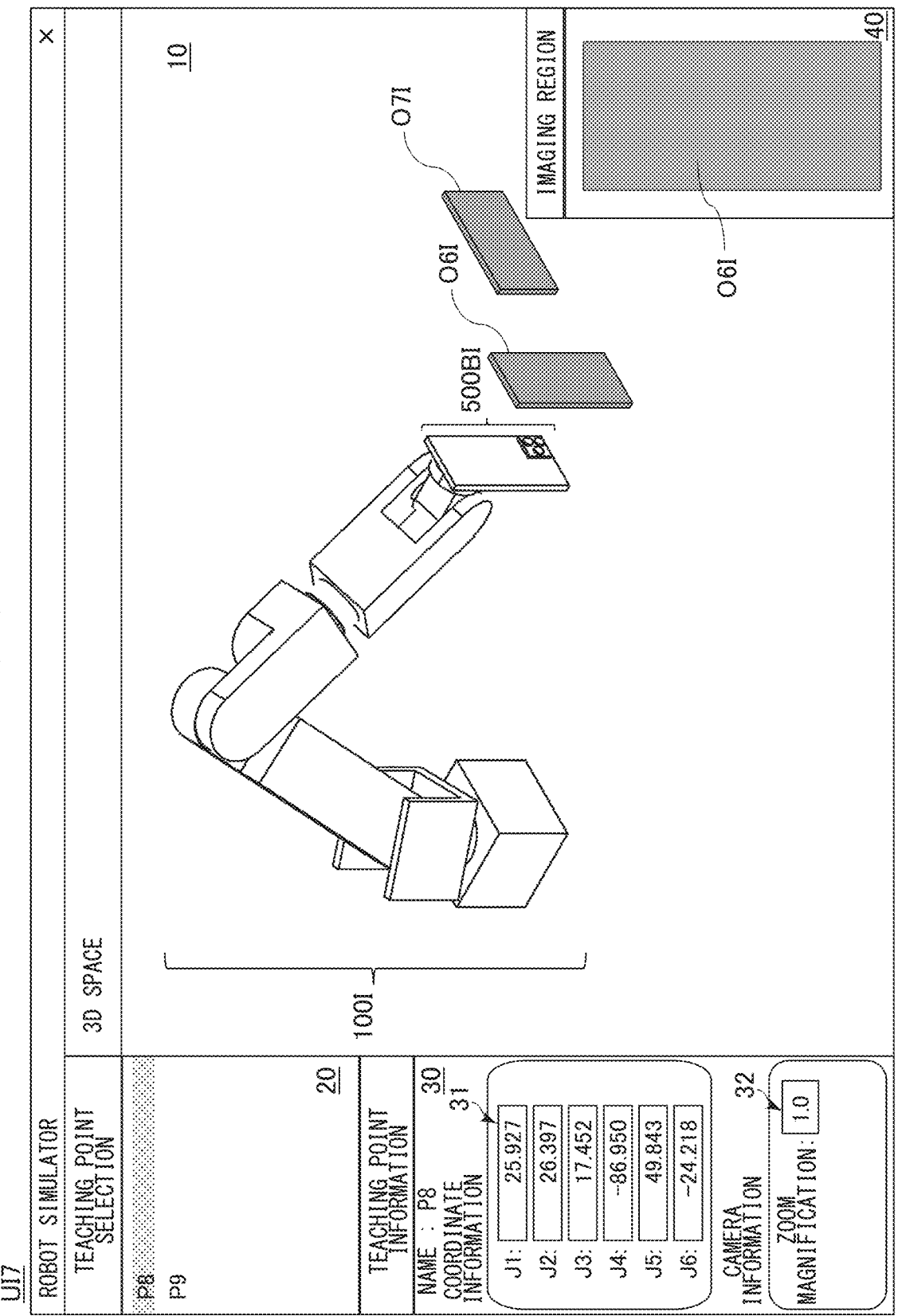
FIG. 23 is an explanatory diagram of an example of a UI window according to the fifth embodiment.
Figure 24:
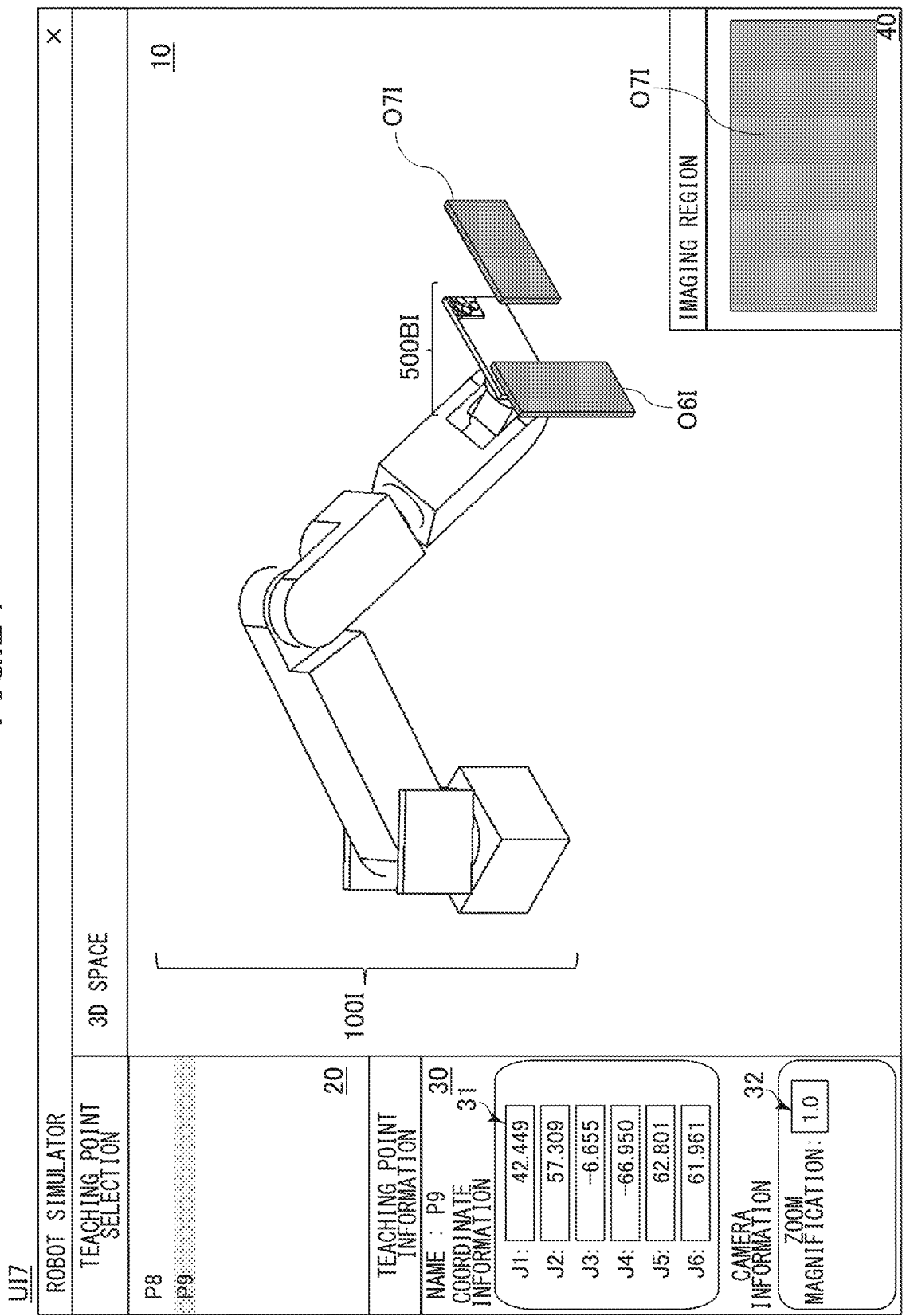
FIG. 24 is an explanatory diagram of an example of a UI window according to the fifth embodiment.

FIGS. 23 and 24 are explanatory diagrams of an example of a UI window UI7 according to the fifth embodiment. When the CPU 311 executes the program 350, the CPU 311 displays, on the display 302, the UI window UI7 serving as an example of a UI image as illustrated in FIG. 23 or 24. In the fifth embodiment, the CPU 311 receives input and selection from a user via the UI window UI7. To be noted, although the input from the user via the UI window UI7 can be performed by using the keyboard 303 and the mouse 304, the configuration is not limited to this. In addition, although the selection by the user via the UI window UI7 can be performed by using the mouse 304, the configuration is not limited to this.

Similarly to the UI windows UI1 to UI3 described in the various embodiments described above, the UI window UI7 includes a three-dimensional space display area 10, a teaching point selection area 20, a teaching point information display area 30, and an imaging region display area 40. The three-dimensional space display area 10 displays a robot image 100I corresponding to the virtual robot 100V, a camera image 500BI corresponding to the virtual image pickup apparatus 500BV, and images O6I and O7I corresponding to the virtual imaging target O6V and O7V.

The teaching point selection area 20 displays a list of names assigned to the teaching points to which the virtual robot 100V is to be operated. In the example of FIGS. 23 and 24, names "P8" and "P9" of the two teaching points that have been already registered are displayed in the teaching point selection area 20. In the description below, the two teaching points will be referred to as teaching points P8 and P9 for the sake of convenience of description. In the teaching point selection area 20, the name of a currently selected teaching point is displayed in an emphasized manner.

In the example of FIG. 23, the teaching point P8 is selected. The teaching point P8 is coordinate information of an orientation of the virtual robot 100V at the time when the virtual image pickup apparatus 500BV virtually images the virtual imaging target O6V. At this time, the virtual image pickup apparatus 500BV is in such an orientation that the longer side thereof is in the vertical direction similarly to the virtual imaging target O6V In other words, the virtual image pickup apparatus 500BV is vertically oriented. In this case, the imaging region display area 40 is automatically updated to be displayed in a form that is longer in the vertical direction as illustrated in FIG. 23. As a result of this, the user can accurately grasp how the virtual imaging target O6V is imaged even in the case where the virtual image pickup apparatus 500BV is vertically oriented.

In addition, in the example of FIG. 24, the teaching point P9 is selected. The teaching point P9 is coordinate information of an orientation of the virtual robot 100V at the time when the virtual image pickup apparatus 500BV virtually images the virtual imaging target O7V. At this time, the virtual image pickup apparatus 500BV is in such an orientation that the longer side thereof is in the horizontal direction similarly to the virtual imaging target O7V In other words, the virtual image pickup apparatus 500BV is horizontally oriented. In this case, the imaging region display area 40 is automatically updated to be displayed in a form that is longer in the horizontal direction as illustrated in FIG. 24. As a result of this, the user can accurately grasp how the virtual imaging target O7V is imaged even in the case where the virtual image pickup apparatus 500BV is horizontally oriented.

As described above, according to the fifth embodiment, for example, in the case of an image pickup apparatus, for example, an image pickup apparatus incorporated in a mobile terminal such as a smartphone in which the orientation of the captured image changes in accordance with the orientation of the image pickup apparatus, the aspect ratio of the display of the imaging region is also changed accordingly in the simulator. As a result of this, the user can accurately grasp how the imaging is performed on the simulator, and thus can efficiently design the operation of the robot 100 and the operation of the image pickup apparatus 500B. In addition, the various embodiments and modification examples thereof described above may be implemented in combination with the present embodiment and/or modification examples thereof.

Sixth Embodiment

Figure 25:
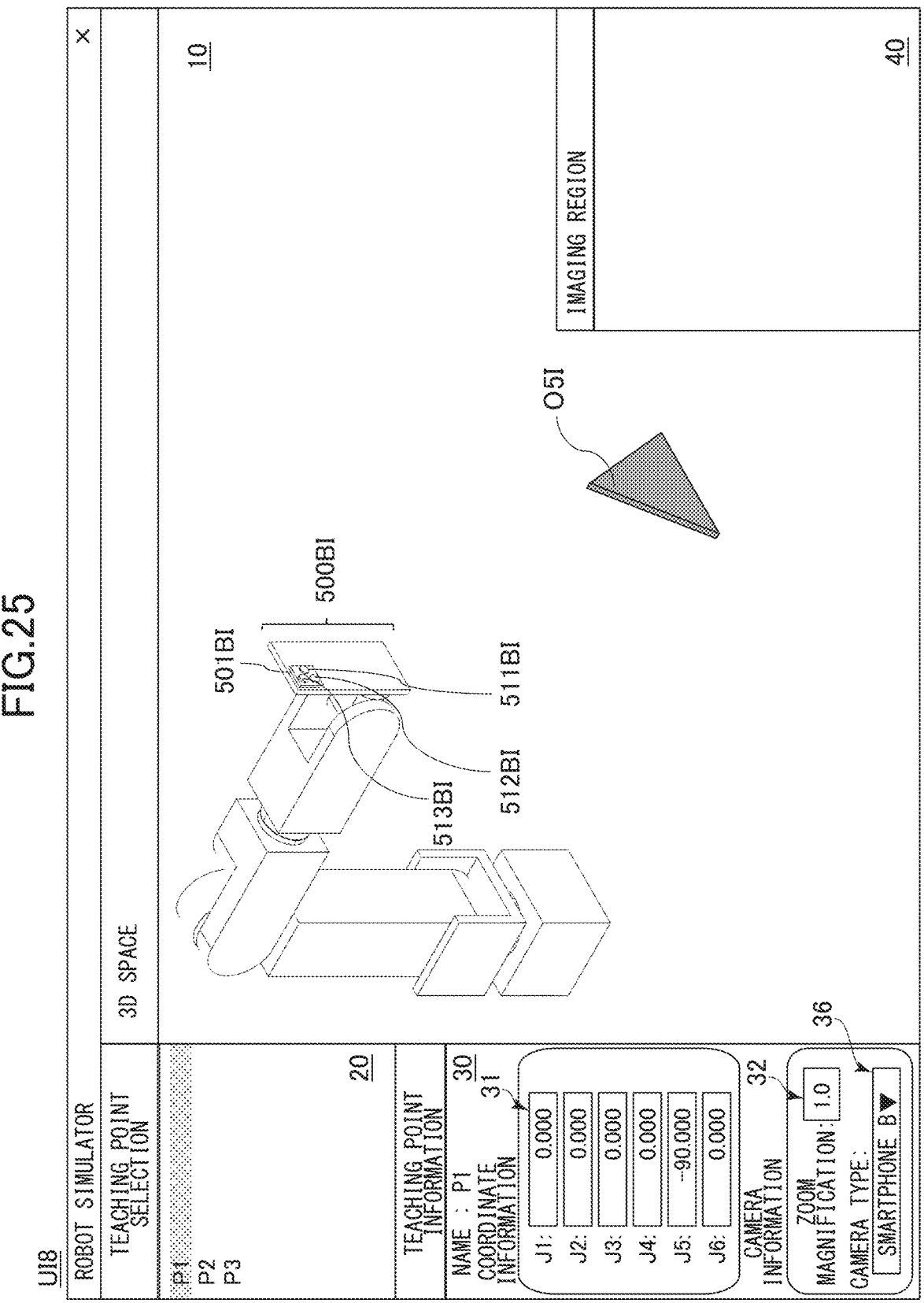
FIG. 25 is an explanatory diagram of an example of a UI window according to a sixth embodiment.
Figure 26:
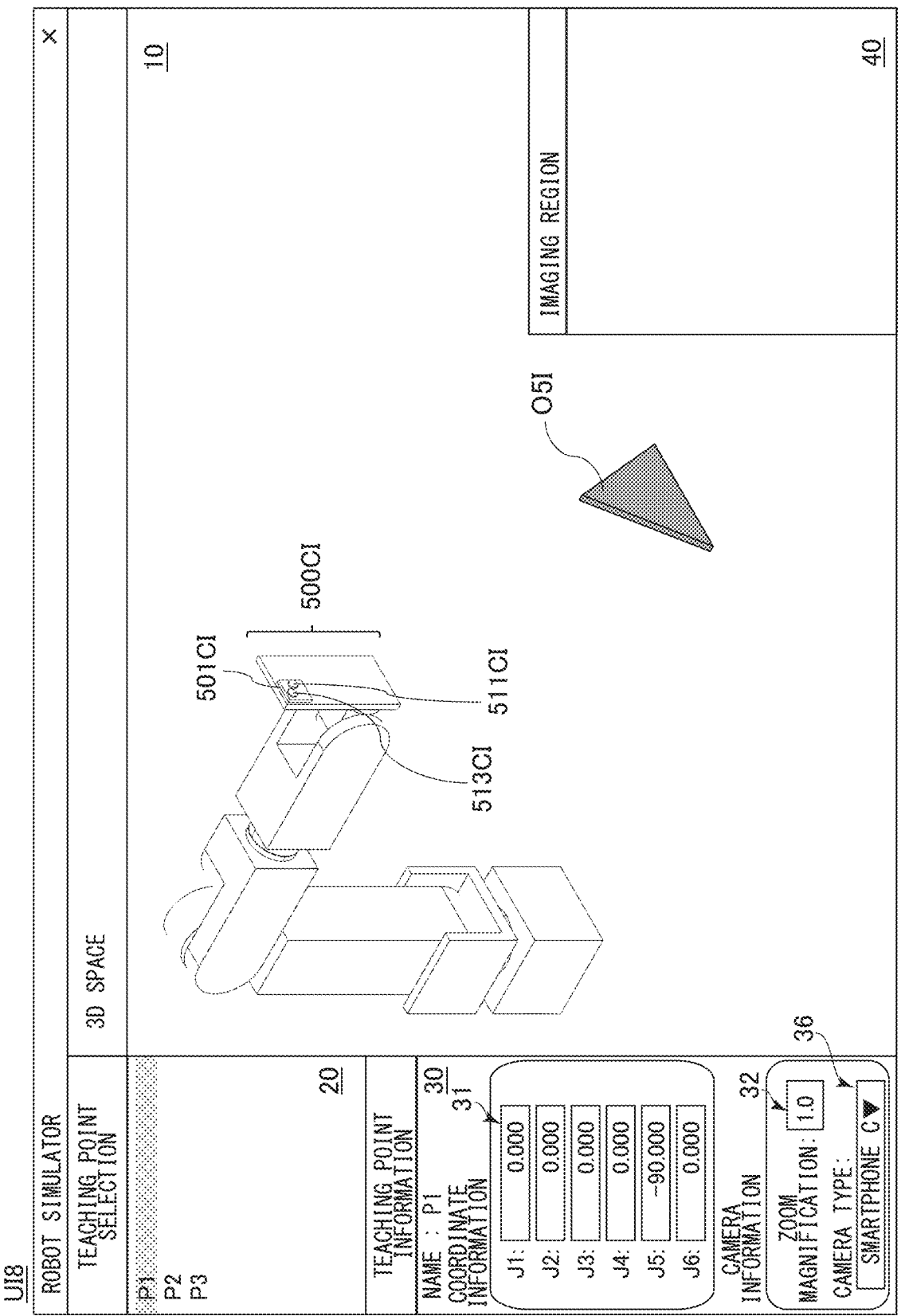
FIG. 26 is an explanatory diagram of an example of a UI window according to the sixth embodiment.

A sixth embodiment will be described. FIGS. 25 and 26 are explanatory diagrams of an example of a UI window UI8 according to the sixth embodiment. To be noted, in the sixth embodiment, description of substantially the same elements as in the various embodiments described above will be simplified or omitted. The configuration of the robot system in the sixth embodiment is the same as that described in the first embodiment. When the CPU 311 executes the program 350, the CPU 311 displays, on the display 302, the UI window UI8 serving as an example of a UI image as illustrated in FIG. 25 or 26. In the sixth embodiment, the CPU 311 receives input and selection from a user via the UI window UI8. To be noted, although the input from the user via the UI window UI8 can be performed by using the keyboard 303 and the mouse 304, the configuration is not limited to this. In addition, although the selection by the user via the UI window UI8 can be performed by using the mouse 304, the configuration is not limited to this. Similarly to the UI windows UI1 to UI3, UI6, and UI7 described in the various embodiments described above, the UI window UI8 includes a three-dimensional space display area 10, a teaching point selection area 20, a teaching point information display area 30, and an imaging region display area 40.

In the sixth embodiment, the teaching point information display area 30 includes a camera type selection box 36 in addition to the boxes 31 and 32. In the camera type selection box 36, a camera to be used in the robot system can be selected from a plurality of predetermined types of cameras. In the example of FIG. 25, the virtual image pickup apparatus 500BV is selected, and the camera image 500BI corresponding to the virtual image pickup apparatus 500BV is displayed. The virtual image pickup apparatus 500BV includes the virtual image pickup portion 501BV. The virtual image pickup portion 501BV includes the first virtual lens 511BV, the second virtual lens 512BV, and the third virtual lens 513BV that have different focal lengths. In the three-dimensional space display area 10 illustrated in FIG. 25, camera images 501BI, 511BI, 512BI, and 513BI respectively corresponding to the virtual image pickup portion 501BV, the first virtual lens 511BV, the second virtual lens 512BV, and the third virtual lens 513BV are displayed.

In the example of FIG. 26, an unillustrated virtual image pickup apparatus different from the virtual image pickup apparatus 500BV is selected, and a camera image 500CI corresponding to the unillustrated virtual image pickup apparatus is displayed. An unillustrated virtual image pickup portion is set for the unillustrated virtual image pickup apparatus. The unillustrated virtual image pickup portion includes an unillustrated fourth virtual lens and an unillustrated fifth virtual lens that have different focal lengths. In the three-dimensional space display area 10 illustrated in FIG. 26, camera images 501CI, 511CI, and 513CI respectively corresponding to the unillustrated virtual image pickup portion, the unillustrated fourth virtual lens, and the unillustrated virtual fifth lens are displayed.

In the example of FIG. 25, "Smartphone B" is selected in the camera type selection box 36. At this time, the three-dimensional space display area 10 displays the camera image 500BI imitating the virtual image pickup apparatus 500BV corresponding to "Smartphone B", and the imaging region display area 40 displays a virtual imaging region imaged by "Smartphone B".

In the example of FIG. 26, "Smartphone C" is selected in the camera type selection box 36. At this time, the three-dimensional space display area 10 displays the camera image 500CI imitating the virtual image pickup apparatus 500CV corresponding to "Smartphone C", and the imaging region display area 40 displays a virtual imaging region imaged by "Smartphone C".

As described above, according to the sixth embodiment, even in the case where there are a plurality of image pickup apparatuses incorporated in robots or a plurality of mobile terminals including image pickup apparatuses, the image pickup apparatus can be easily switched on the robot simulator, and thus the user can easily grasp how the imaging is to be performed. Therefore, in the case where there are a plurality of image pickup apparatuses that can be used, the user can efficiently design the operation of the robot 100 and the operations related to respective image pickup apparatuses in the robot system. In addition, the various embodiments and modification examples thereof described above may be implemented in combination with the present embodiment and/or modification examples thereof.

Seventh Embodiment

A seventh embodiment will be described. FIGS. 27 to 30 are explanatory diagrams of an example of a UI window UI9 according to the seventh embodiment. To be noted, in the seventh embodiment, description of substantially the same elements as in the various embodiments described above will be simplified or omitted. The configuration of the robot system in the seventh embodiment is the same as that described in the first embodiment. When the CPU 311 executes the program 350, the CPU 311 displays, on the display 302, the UI window UI9 serving as an example of a UI image as illustrated in FIGS. 27 to 30. In the seventh embodiment, the CPU 311 receives input and selection from a user via the UI window UI9. To be noted, although the input from the user via the UI window UI9 can be performed by using the keyboard 303 and the mouse 304, the configuration is not limited to this. In addition, although the selection by the user via the UI window UI9 can be performed by using the mouse 304, the configuration is not limited to this. Similarly to the UI windows UI1 to UI3, and UI6 to UI8 described in the various embodiments described above, the UI window UI9 includes a three-dimensional space display area 10, a teaching point selection area 20, a teaching point information display area 30, and an imaging region display area 40. The configurations of the robot, the image pickup apparatus, and the imaging targets in the seventh embodiment are the configurations of the robot 100, the image pickup apparatus 500A, and the imaging targets O3 and O4 similarly to the second embodiment described above.

Figure 27:
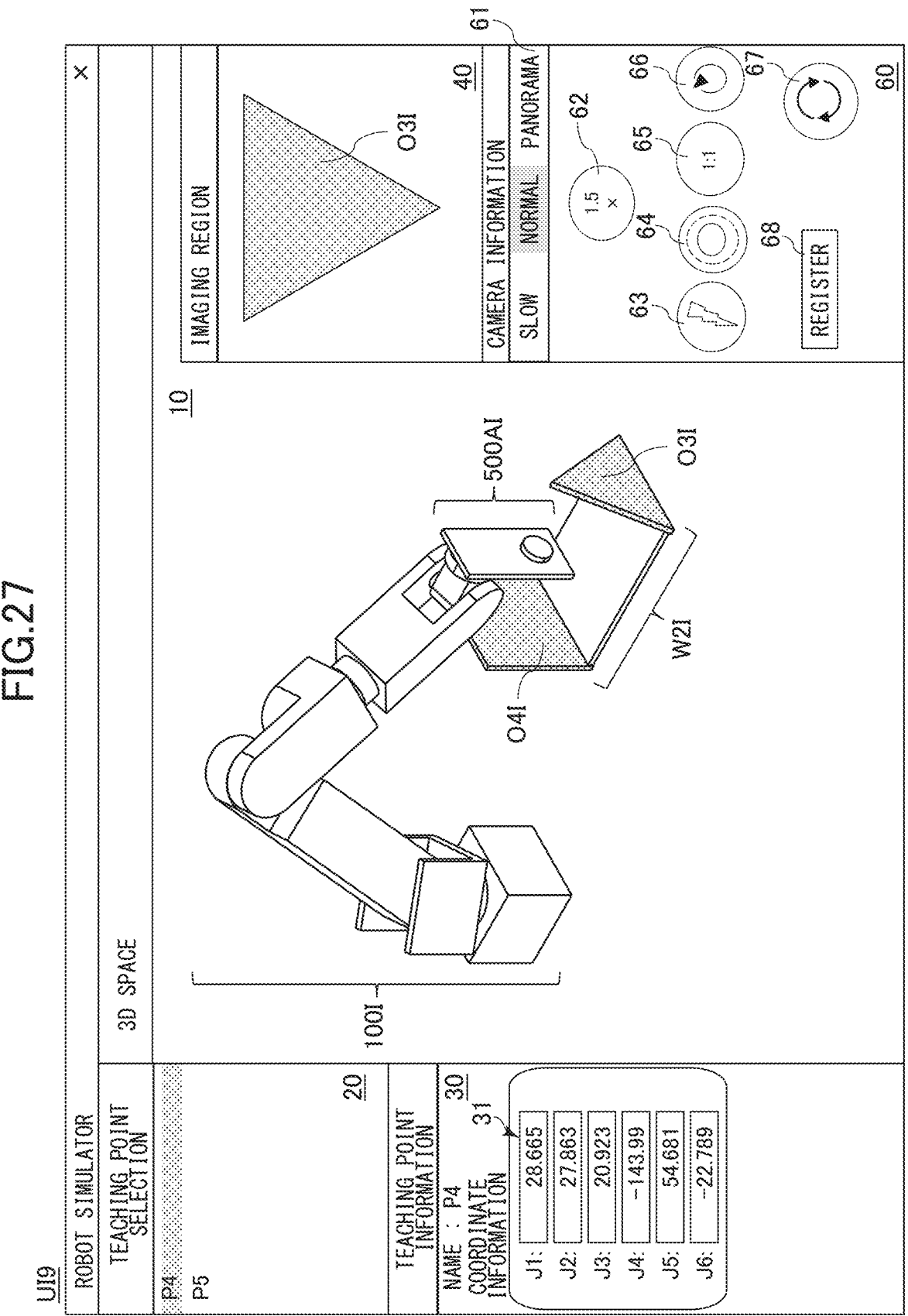
FIG. 27 is an explanatory diagram of an example of a UI window according to a seventh embodiment.

As illustrated in FIG. 27, in the seventh embodiment, an imaging information setting area 60 is displayed in the UI window UI9 as a screen for confirming and setting camera information for each teaching point. For example, the imaging information setting area 60 is disposed below the imaging region display area 40. To be noted, although the imaging information setting area 60 is disposed below the imaging region display area 40 in the seventh embodiment, the configuration is not limited to this. For example, the imaging information setting area 60 may be displayed above the imaging region display area 40.

The imaging information setting area 60 including an imaging setting UI similar to an imaging setting UI in the image pickup apparatus 500A incorporated in a smartphone. The imaging information setting area 60 displays an imaging mode setting bar 61, a zoom magnification setting button 62, a flash setting button 63, a live imaging setting button 64, an aspect ratio setting button 65, a timer setting button 66, a front-rear switching button 67, and a registration button 68.

Figure 28:
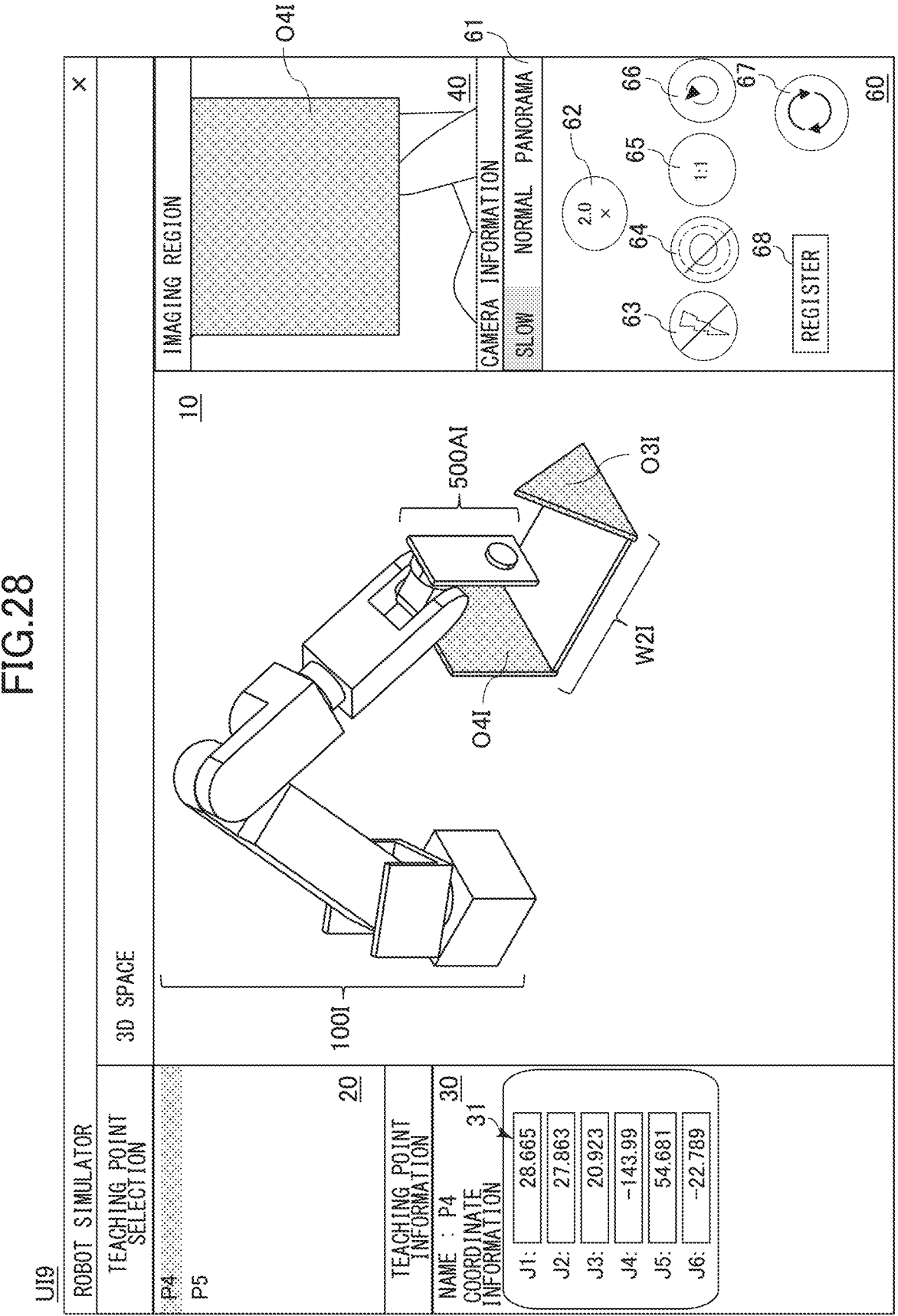
FIG. 28 is an explanatory diagram of an example of a UI window according to the seventh embodiment.

The imaging mode setting bar 61 is a UI for setting, in the simulator, that is, in the information processing apparatus, an imaging mode set in the image pickup apparatus 500A when causing the image pickup apparatus 500A to perform imaging. As illustrated in FIG. 27, in the seventh embodiment, the user can set a normal mode, a slow mode, or a panorama mode in the simulator as an imaging mode, by operating the imaging mode setting bar 61. In the example of FIG. 27, the normal mode is set, and the part of "Normal" in the imaging mode setting bar 61 is displayed in an emphasized manner in a gray scale. When "Slow" is clicked in the state illustrated in FIG. 27, the part of "Slow" is displayed in an emphasized manner as illustrated in FIG. 28. The same applies to the panorama mode. The user can easily set the imaging mode in association with each teaching point by operating the imaging mode setting bar 61, and can also easily grasp which imaging mode is set.

The zoom magnification setting button 62 is a UI for setting the zoom magnification for imaging by the image pickup apparatus 500A. In the example of FIG. 27, the zoom magnification is set to 1.5×. If the zoom magnification setting button 62 is clicked once in the state illustrated in FIG. 27, the zoom magnification is set to 2.0× as illustrated in FIG. 28. Then the zoom magnification returns to the lowest magnification if the zoom magnification setting button 62 is clicked a predetermined number of times. The lowest magnification, the highest magnification, and the amount of change of the zoom magnification per click that are settable can be set freely. The user can easily set the zoom magnification in association with each of the teaching points by operating the zoom magnification setting button 62 of the UI window UI9, and can also easily grasp which setting of the zoom magnification is used.

The flash setting button 63 is a UI for setting whether or not to use flash when causing the image pickup apparatus 500A to perform imaging. In the example of FIG. 27, the flash setting is ON, and when the flash setting button 63 is clicked in the state illustrated in FIG. 27, a diagonal line is displayed on the flash setting button 63 as illustrated in FIG. 28. In the state illustrated in FIG. 28, the flash setting is OFF. The user can easily set whether or not to use flash in association with each of the teaching points by operating the flash setting button 63, and can also easily grasp whether or not to use flash.

The live imaging setting button 64 is a UI for setting whether or not to record a moving image and a sound together for a predetermined period when causing the image pickup apparatus 500A to perform imaging. Although the predetermined period is set to 1.5 seconds in the seventh embodiment, the predetermined period is not limited to this, and can be set freely. In the example of FIG. 27, the live imaging setting is ON, and when the live imaging setting button 64 is clicked in the state illustrated in FIG. 27, a diagonal line is displayed on the live imaging setting button 64 as illustrated in FIG. 28. In the state illustrated in FIG. 28, the live imaging setting is OFF. The user can easily set whether or not live imaging is to be performed in association with each teaching point, and can also easily grasp whether or not to perform the live imaging.

Figure 29:
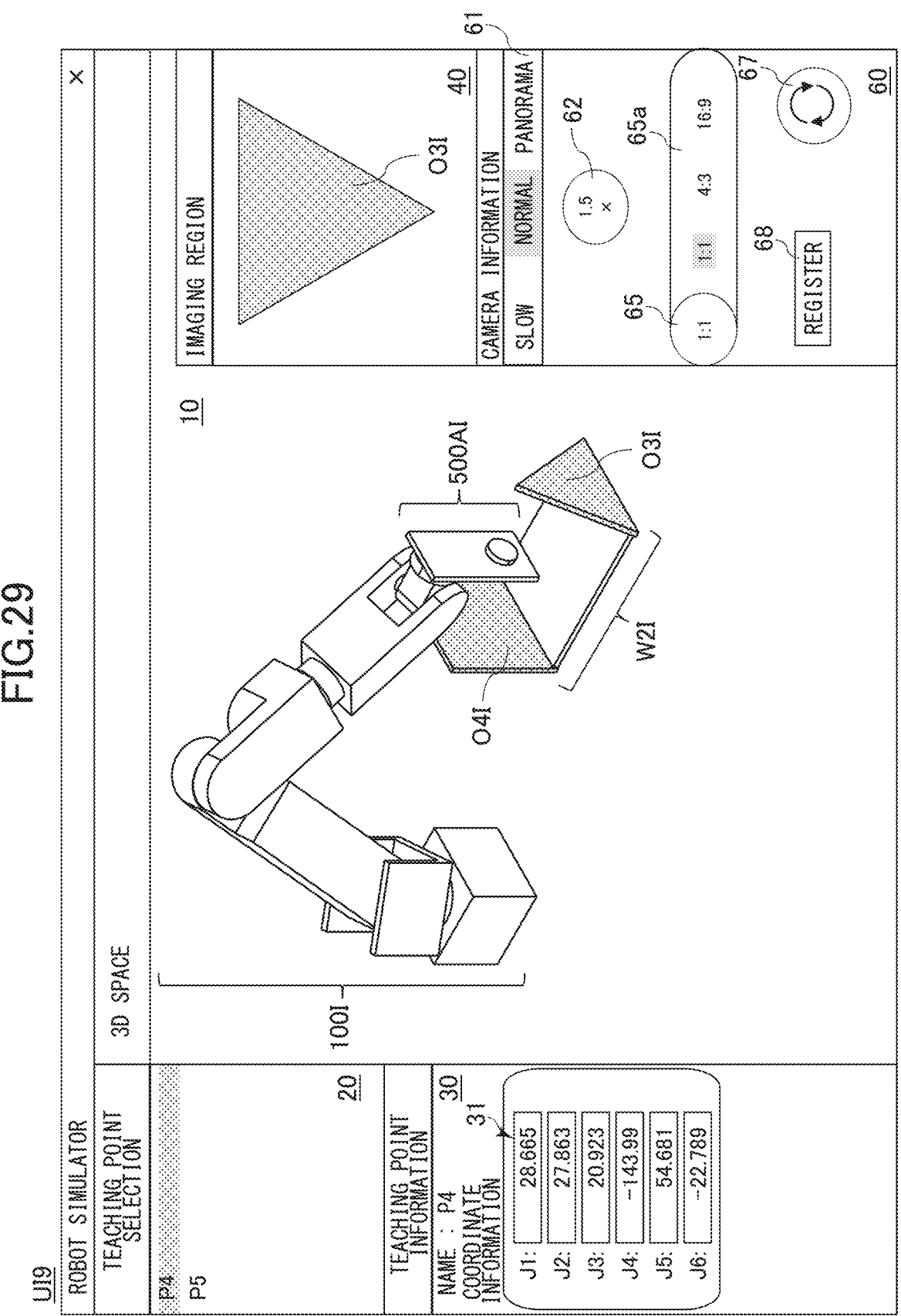
FIG. 29 is an explanatory diagram of an example of a UI window according to the seventh embodiment.

The aspect ratio setting button 65 is a UI for setting the aspect ratio of the captured image when causing the image pickup apparatus 500A to perform imaging. In the example illustrated in FIG. 27, the aspect ratio is set to 1:1. When the aspect ratio setting button 65 is clicked in the state illustrated in FIG. 27, an aspect ratio setting bar 65a is displayed as illustrated in FIG. 29. In the seventh embodiment, the user can select and set the aspect ratio of the captured image among 1:1, 4:3, and 16:9 by using the aspect ratio setting bar 65a. In the example illustrated in FIG. 28, the aspect ratio is set to 1:1, and therefore "1:1" of the aspect ratio setting bar 65a is displayed in an emphasized manner in a gray scale. If "4:3" or "16:9" of the aspect ratio setting bar 65a is clicked, the clicked characters indicating the aspect ratio are displayed in an emphasized manner in a gray scale, and the aspect ratio of the image of the imaging region display area 40 is changed.

Figure 30:
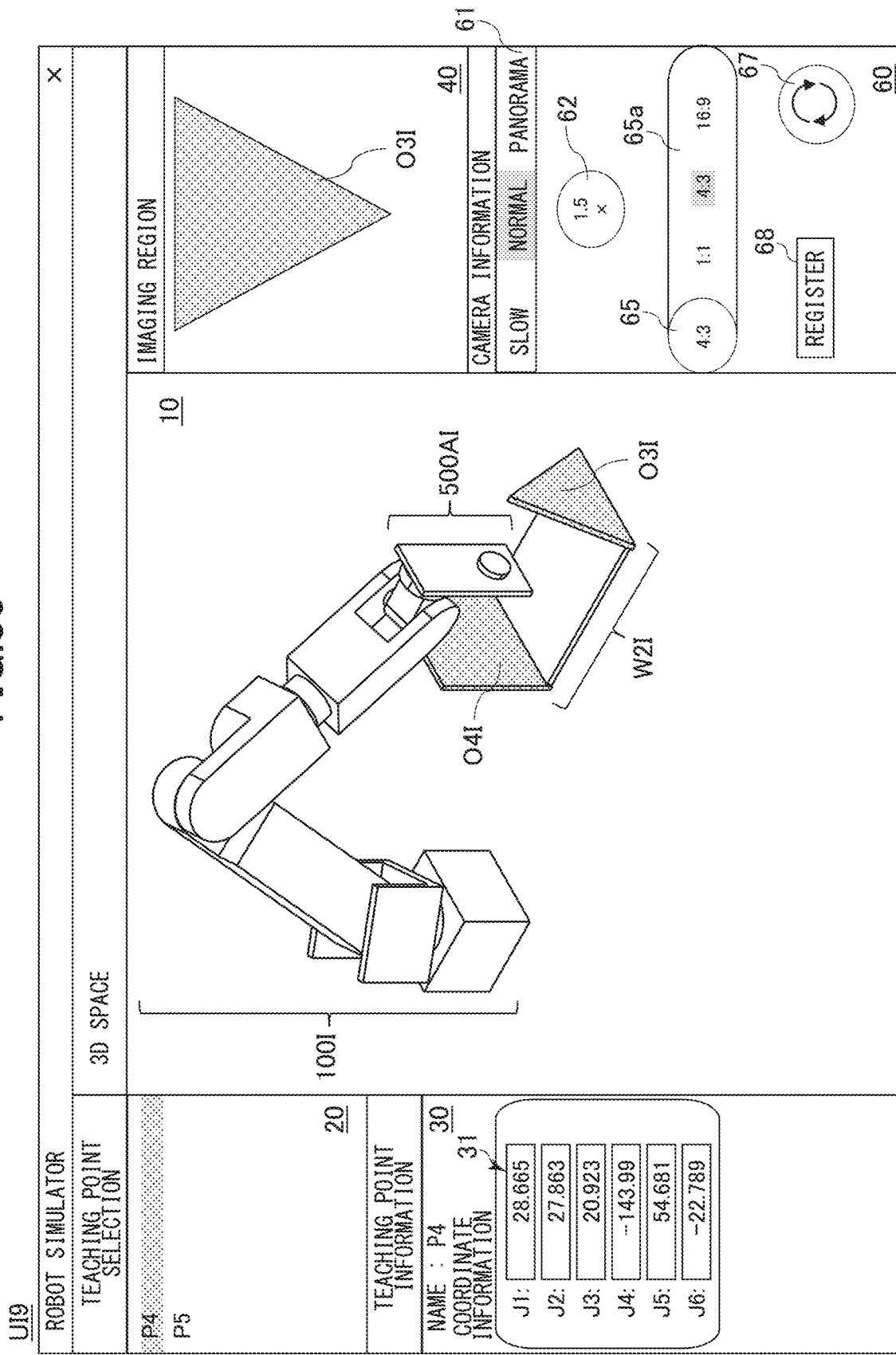
FIG. 30 is an explanatory diagram of an example of a UI window according to the seventh embodiment.

FIG. 30 illustrates the UI window UI9 in which the aspect ratio is set to 4:3. "4:3" in the aspect ratio setting bar 65a is displayed in an emphasized manner in a gray scale, and the aspect ratio of the image of the imaging region display area 40 is set to 4:3. When a part other than the aspect ratio setting button 65 and the aspect ratio setting bar 65a in the imaging information setting area 60 is clicked in the state illustrated in FIG. 30, the selected aspect ratio is set, and the screen returns to the state illustrated in FIG. 27. The user can easily set the aspect ratio in association with each teaching point, and can also easily grasp which aspect ratio is set.

Figure 31:
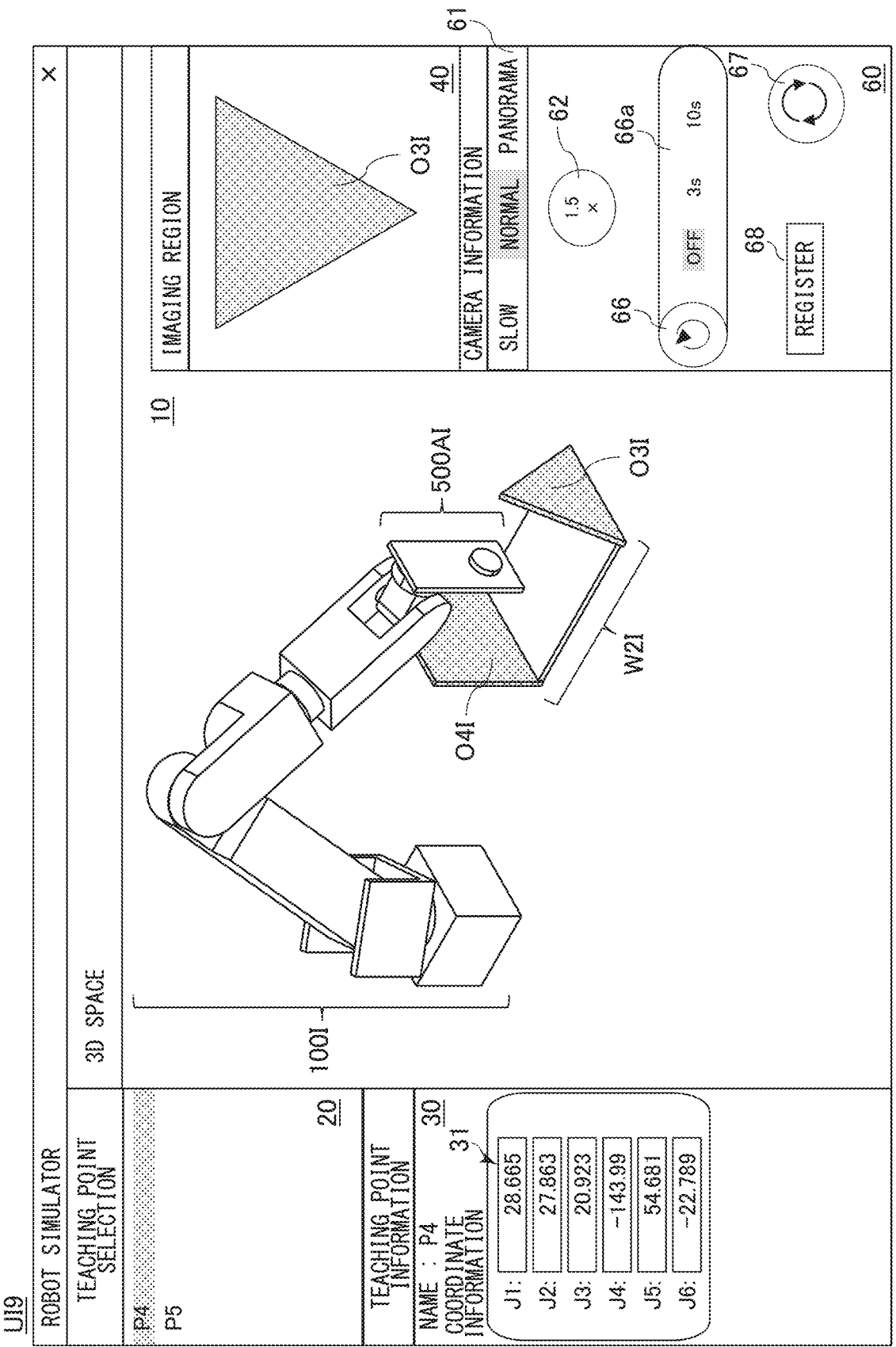
FIG. 31 is an explanatory diagram of an example of a UI window according to the seventh embodiment.

The timer setting button 66 is a UI for setting whether or not to set a so-called timer for generating a time difference between the timing at which the image pickup apparatus 500A is instructed to perform imaging and the timing at which the image pickup apparatus 500A actually performs imaging in the imaging by the image pickup apparatus 500A. When the timer setting button 66 is clicked in the state illustrated in FIG. 27, a timer setting bar 66a is displayed as illustrated in FIG. 31. In the seventh embodiment, the user can make a selection from "OFF" indicating a timer off state, "3s" indicating 3 seconds, and "10s" indicating 10 seconds from the timer setting bar 66a to turn off the timer or set the time count for the timer. In the example illustrated in FIG. 31, the timer is set to be off, and therefore "OFF" of the timer setting bar 66a is displayed in an emphasized manner in a gray scale. When "3s" or "10s" in the timer setting bar 66a is clicked, the clicked characters indicating the timer are displayed in an emphasized manner in a gray scale. When a part other than the timer setting button 66 and the timer setting bar 66a in the imaging information setting area 60 is clicked in the state illustrated in FIG. 31, the selected timer is set, and the screen returns to the state illustrated in FIG. 27. The user can easily set the timer in association with each teaching point, and can also easily grasp how the timer is set.

The front-rear switching button 67 is a UI for setting which of the front camera and the rear camera is to be used for imaging by the image pickup apparatus 500A. In the example of FIG. 27, the rear camera is set, and the image O3I corresponding to the virtual imaging target O3V imaged by the virtual image pickup apparatus 500AV is displayed in the imaging region display area 40. When the front-rear switching button 67 is clicked in the state of FIG. 27, the front camera is set as illustrated in FIG. 28. In the imaging region display area 40 illustrated in FIG. 28, the image O4I corresponding to the virtual imaging target O4V imaged by the virtual image pickup apparatus 500AV is displayed. The user can easily set which of the front camera and the rear camera is to be used for each teaching point, and can also easily grasp which setting is used from what is displayed in the imaging region display area 40.

The registration button 68 is a UI for registering the information set via the imaging mode setting bar 61, the zoom magnification setting button 62, the flash setting button 63, the live imaging setting button 64, the aspect ratio setting button 65, the timer setting button 66, and the front-rear switching button 67 in association with the teaching point.

As described above, in the seventh embodiment, in the case where the image pickup apparatus is a mobile terminal such as a smartphone, the UI for imaging setting on the robot simulator is designed to be partially the same as the UI of the mobile terminal. As a result of this, the user can intuitively perform imaging settings. In addition, the user can easily grasp which image settings are set for each teaching point, by checking the imaging information setting area 60. Therefore, the user can efficiently design the operation of the robot 100 and the operation of the image pickup apparatus 500A. In addition, the various embodiments and modification examples thereof described above may be implemented in combination with the present embodiment and/or modification examples thereof.

The present disclosure is not limited to the embodiments described above, and embodiments can be modified in many ways within the technical concept of the present disclosure. For example, the different embodiments described above may be implemented in combination. In addition, the effects described in the embodiments are merely enumeration of the most preferable effects that can be obtained from embodiments of the present disclosure, and the effects of embodiments of the present disclosure are not limited to those described in the embodiments.

Although a case where the robot is a vertically articulated robot arm has been described in the embodiments described above, the configuration is not limited to this. The robot may be various robots, examples of which include horizontally articulated robot arms, parallel link robot arms, and orthogonal robots. In addition, the present disclosure is applicable to machines that automatically perform contraction, bending, vertical movement, horizontal movement, turning, or a composite operation of these on the basis of information in a storage device provided in a control apparatus.

The disclosure of the embodiments described above include the following items.

Item 1

An information processing apparatus including:

a processor configured to simulate a virtual robot and a virtual image pickup apparatus moving in an interlocked manner with each other in a virtual space, wherein the processor is configured to associate setting information of the virtual image pickup apparatus with a teaching point of the virtual robot.

Item 2

The information processing apparatus according to Item 1, wherein the processor is configured to receive input of the setting information to be associated with the teaching point.

Item 3

The information processing apparatus according to Item 1 or 2, wherein the processor is configured to display, on a display portion, an image for receiving input of the setting information to be associated with the teaching point.

Item 4

The information processing apparatus according to Item 3, wherein the image for receiving the input of the setting information includes a first button used for loading the setting information from a storage portion.

Item 5

The information processing apparatus according to Item 4, wherein the image for receiving the input of the setting information includes a second button used for storing the setting information in the storage portion.

Item 6

The information processing apparatus according to any one of Items 1 to 5, wherein the processor is configured to display, on a display portion, an image obtained by a virtual imaging operation by the virtual image pickup apparatus based on the setting information in a state in which the virtual image pickup apparatus has been moved in an interlocked manner with the virtual robot that has been moved to the teaching point.

Item 7

The information processing apparatus according to any one of Items 1 to 6, wherein an image corresponding to the virtual robot that has been operated to the teaching point is displayed on the display portion.

Item 8

The information processing apparatus according to any one of Items 1 to 7, wherein a plurality of teaching points that are each the teaching point are provided, and the setting information is uniquely associated with each of the plurality of teaching points.

Item 9

The information processing apparatus according to any one of Items 1 to 8, wherein the setting information includes information of a field angle of the virtual image pickup apparatus.

Item 10

The information processing apparatus according to any one of Items 1 to 9, wherein the virtual image pickup apparatus is incorporated in a virtual mobile terminal, and the processor is configured to associate the setting information set by a function of the virtual mobile terminal with the teaching point.

Item 11

The information processing apparatus according to Item 10, wherein the setting information includes information of an imaging direction of the virtual image pickup apparatus.

Item 12

The information processing apparatus according to Item 10 or 11, wherein the virtual image pickup apparatus includes a first virtual camera configured to virtually perform imaging in a first direction, and a second virtual camera configured to virtually perform imaging in a second direction opposite to the first direction, and the processor is configured to associate, with the teaching point, information indicating which of the first virtual camera and the second virtual camera is to be used.

Item 13

The information processing apparatus according to Item 12, wherein the first virtual camera is a virtual front camera, and the second virtual camera is a virtual rear camera.

Item 14

The information processing apparatus according to any one of Items 10 to 13, wherein the processor is capable of setting a zoom magnification of the virtual image pickup apparatus to 1.0× or less.

Item 15

The information processing apparatus according to any one of Items 10 to 14, wherein, in a case where an orientation of the virtual mobile terminal is changed, the processor changes, in accordance with a change in the orientation, an image that is obtained by a virtual imaging operation by the virtual image pickup apparatus.

Item 16

The information processing apparatus according to any one of Items 10 to 15, wherein the processor is capable of setting the virtual mobile terminal of a plurality of types.

Item 17

The information processing apparatus according to any one of Items 10 to 16, wherein the virtual mobile terminal is a virtual smartphone, and the processor is configured to display, together with an image obtained by a virtual imaging operation by the virtual image pickup apparatus of the virtual smartphone, a user interface for causing the virtual image pickup apparatus of the virtual smartphone to execute the virtual imaging operation.

Item 18

The information processing apparatus according to Item 17, wherein the processor is capable of setting, through the user interface, at least one of a setting of an imaging mode, a setting of a zoom magnification, a setting of flash, a setting of live imaging, a setting of an aspect ratio, a setting of timer, or a setting regarding which of a front camera and a rear camera is to be used.

Item 19

A robot system including:
a robot;
an image pickup apparatus held by the robot;
a control apparatus configured to control the robot and the image pickup apparatus; and
the information processing apparatus according to any one of Items 1 to 18.

Item 20

The robot system according to Item 19, wherein the control apparatus controls the robot on a basis of the teaching point, and controls the image pickup apparatus on a basis of the setting information associated with the teaching point.

Item 21

An information processing method for simulating a virtual robot and a virtual image pickup apparatus moving in an interlocked manner with each other in a virtual space, the information processing method including:
associating setting information of the virtual image pickup apparatus with a teaching point of the virtual robot.

Item 22

A manufacturing method for a product, the manufacturing method including manufacturing the product by using the robot system according to Item 19 or 20.

Item 23

A program for causing a computer to execute the information processing method according to Item 21.

Item 24

A computer-readable recording medium storing the program according to Item 23.

According to the present disclosure, the operation of a robot and the operation related to imaging by an image pickup apparatus can be efficiently designed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-27375, filed Feb. 25, 2022, and Japanese Patent Application No. 2023-8244, filed Jan. 23, 2023, which are hereby incorporated by reference herein in their entirety.

What is claimed is:

1. An information processing apparatus comprising:
a processor configured to simulate a virtual robot and a virtual image unit moving in an interlocked manner with each other in a virtual space, the virtual image unit being incorporated in a virtual mobile terminal,
wherein the virtual image unit includes a first virtual camera configured to virtually perform imaging in a first direction, and a second virtual camera configured to virtually perform imaging in a second direction different from the first direction, and
wherein the processor is configured to associate setting information indicating a camera used at a teaching point of the virtual robot among the first virtual camera and the second virtual camera with the teaching point.

2. The information processing apparatus according to claim 1, wherein the processor is configured to receive input of the setting information to be associated with the teaching point.

3. The information processing apparatus according to claim 1, wherein the processor is configured to display, on a display portion, an image for receiving input of the setting information to be associated with the teaching point.

4. The information processing apparatus according to claim 3, wherein the image for receiving the input of the setting information includes a first button used for loading the setting information from a storage portion.

5. The information processing apparatus according to claim 4, wherein the image for receiving the input of the setting information includes a second button used for storing the setting information in the storage portion.

6. The information processing apparatus according to claim 1, wherein the processor is configured to display, on a display portion, an image obtained by a virtual imaging operation by the virtual image unit based on the setting information in a state in which the virtual image unit has been moved in an interlocked manner with the virtual robot that has been moved to the teaching point.

7. The information processing apparatus according to claim 1, wherein an image corresponding to the virtual robot that has been operated to the teaching point is displayed on a display portion.

8. The information processing apparatus according to claim 1, wherein a plurality of teaching points are provided, and setting information is uniquely associated with each of the plurality of teaching points.

9. The information processing apparatus according to claim 1, wherein the setting information includes information of a field angle of the virtual image unit.

10. The information processing apparatus according to claim 1, wherein the setting information includes information of an imaging direction of the virtual image unit.

11. The information processing apparatus according to claim 1, wherein the first virtual camera is a virtual front camera, and the second virtual camera is a virtual rear camera.

12. The information processing apparatus according to claim 1, wherein the processor is capable of setting a zoom magnification of the virtual image unit to 1.0× or less.

13. The information processing apparatus according to claim 1, wherein, in a case where an orientation of the virtual mobile terminal is changed, the processor changes, in accordance with a change in the orientation, an image that is obtained by a virtual imaging operation by the virtual image unit.

14. The information processing apparatus according to claim 1, wherein the processor is capable of setting the virtual mobile terminal of a plurality of types.

15. The information processing apparatus according to claim 1,
wherein the virtual mobile terminal is a virtual smartphone, and
the processor is configured to display, together with an image obtained by a virtual imaging operation by the virtual image unit of the virtual smartphone, a user interface for causing the virtual image unit of the virtual smartphone to execute the virtual imaging operation.

16. The information processing apparatus according to claim 15, wherein the processor is capable of setting, through the user interface, at least one of a setting of an imaging mode, a setting of a zoom magnification, a setting of flash, a setting of live imaging, a setting of an aspect ratio, a setting of timer, or a setting regarding which of a front camera and a rear camera is to be used.

17. A robot system comprising:
a robot;
a mobile terminal held by the robot;
a control apparatus configured to control the robot and the mobile terminal; and
the information processing apparatus according to claim 1.

18. The robot system according to claim 17, wherein the control apparatus controls the robot on a basis of the teaching point, and controls the mobile terminal on a basis of the setting information associated with the teaching point.

19. A manufacturing method for a product, the manufacturing method comprising manufacturing the product by using the robot system according to claim 17.

20. The information processing apparatus according to claim 1, wherein the processor is configured to display on a display portion whether the first virtual camera or the second virtual camera is set at the teaching point.

21. An information processing method for simulating a virtual robot and a virtual image unit moving in an interlocked manner with each other in a virtual space, the virtual image unit being incorporated in a virtual mobile terminal, the virtual image unit including a first virtual camera configured to virtually perform imaging in a first direction, and a second virtual camera configured to virtually perform imaging in a second direction different from the first direction, the information processing method comprising:
associating setting information indicating a camera used at a teaching point of the virtual robot among the first virtual camera and the second virtual camera with the teaching point.

22. A non-transitory computer-readable recording medium storing a program for causing a computer to execute the information processing method according to claim 21.

* * * * *